(12) United States Patent
Perl

(10) Patent No.: US 11,953,053 B1
(45) Date of Patent: Apr. 9, 2024

(54) BEAM WITH IMPROVED HOLE PATTERNS

(71) Applicant: Bryan Jerome Perl, Fond du Lac, WI (US)

(72) Inventor: Bryan Jerome Perl, Fond du Lac, WI (US)

( * ) Notice: Subject to any disclaimer, the term of this patent is extended or adjusted under 35 U.S.C. 154(b) by 621 days.

(21) Appl. No.: 17/120,103

(22) Filed: Dec. 11, 2020

Related U.S. Application Data

(60) Provisional application No. 62/946,866, filed on Dec. 11, 2019.

(51) Int. Cl.
*B32B 7/02* (2019.01)
*F16B 7/00* (2006.01)

(52) U.S. Cl.
CPC .................................... *F16B 7/00* (2013.01)

(58) Field of Classification Search
CPC ........................................................ B32B 7/02
See application file for complete search history.

(56) References Cited

U.S. PATENT DOCUMENTS

| | | | |
|---|---|---|---|
| 2,936,051 A | 5/1960 | Martin | |
| 5,964,068 A | 10/1999 | O'Neill | |
| 7,464,513 B2 * | 12/2008 | Rioux | E04H 12/08 52/651.1 |
| 8,418,425 B1 * | 4/2013 | Santini | E04H 3/28 52/690 |
| 8,800,238 B2 | 8/2014 | Davies | |
| 9,212,491 B1 | 12/2015 | Santini | |
| 9,803,365 B2 | 10/2017 | Peltier | |
| 2007/0283659 A1 | 12/2007 | Whyte et al. | |
| 2008/0178551 A1 | 7/2008 | Porter | |
| 2010/0192506 A1 | 8/2010 | Allred, III et al. | |
| 2017/0073971 A1 | 3/2017 | Peltier | |

FOREIGN PATENT DOCUMENTS

| | | |
|---|---|---|
| GB | 2232426 | 12/1990 |
| KR | 101974888 | 3/2019 |

OTHER PUBLICATIONS

T3 Systems, T3 Frame Product Brochure—V2, date unknown (date viewed Jul. 30, 2019), 11 pages.

* cited by examiner

*Primary Examiner* — Lawrence D Ferguson
(74) *Attorney, Agent, or Firm* — Brannen Law Office, LLC

(57) ABSTRACT

A beam is provided with hole patterns allowing for increased configurations and tolerances for assembly into a structure. The beam has four side plates and two end plates. The four side plates can have any modular length that is determined by a number of repeating sections. Oppositely oriented side plates have sections with the same hole pattern. In one embodiment, two side plates have hole pattern A and the two other side plates have hole pattern B. The end plates have hole pattern C. Hole pattern A has outer corner and side holes that are straight slots with a longitudinal axis oriented perpendicular to end plate planes. Hole pattern B has outer corner and side holes that are straight slots with a longitudinal axis that is oriented parallel to the end plate planes. Hole pattern C has curved slots that lie on a perimeter of one of two circles.

20 Claims, 22 Drawing Sheets

5  5A 5  5A

BEAM WITH IMPROVED HOLE PATTERNS

This United States utility patent application claims priority on and the benefit of provisional application 62/946,866 filed Dec. 11, 2019, the entire contents of which are hereby incorporated herein by reference.

BACKGROUND OF THE INVENTION

1. Field of the Invention

The present invention relates to a beam with improved hole patterns allowing for increased configurations and tolerances for assembly into a structure.

2. Description of the Related Art

Assemblies of beams are used in many environments including, but not limited to, staging and other structures. In a basic setup, wood can be used to make a support truss for the structure. While this may yield suitable results to some, the use of custom sized wood boards is not without limitations.

Understanding this, some brackets have been developed over the years in an attempt to make the structure assembly process go smoother and quicker. While the brackets were an advancement, their use did not solve every problem inherent to the use of wood to make the structures.

The use of metal beams offered strength over simple wood beams. The metal beams are connected together to form trusses. Some metal beams require connectors to be connected together. Others are connected directly to each other.

Yet, none of the known beams have the assembly flexibility of the beams of the present invention.

Thus, there exists a need for a beam with improve hole patterns that solves these and other problems.

SUMMARY OF THE INVENTION

A beam is provided with hole patterns allowing for increased configurations and tolerances for assembly into a structure. The beam has four side plates and two end plates. The four side plates can have any modular length that is determined by a number of repeating sections. Oppositely oriented side plates have sections with the same hole pattern. In one embodiment, two side plates have hole pattern A and the two other side plates have hole pattern B. The end plates have hole pattern C. Hole pattern A has outer corner and side holes that are straight slots with a longitudinal axis oriented perpendicular to end plate planes. Hole pattern B has outer corner and side holes that are straight slots with a longitudinal axis that is oriented parallel to the end plate planes. Hole pattern C has curved slots that lie on a perimeter of one of two circles.

According to one advantage of the present invention, the beam is modular wherein structures that can be constructed with the beams can have many designs and configurations.

According to another advantage of the present invention, adjacent side plates have outer slots that are oriented perpendicular to each other. This advantageously allow for increased tolerance along two perpendicular axes when connecting beams side-to-side wherein a section with hole pattern A is fastened to a section with hole pattern B.

According to a further advantage of the present invention, each side plate has an inner hole pattern and an outer hole pattern. The inner hole pattern has 12 holes on each section on all four sides. In this regard, there are 12 (in a preferred embodiment) options, resulting in 30-degree increments, for angular variation during side-to-side connection of two beams. The outer hole pattern also has twelve holes equally spaced and lie in a pattern defining a square. Some of the holes are in the inner and outer hole patterns.

According to a still further advantage of the present invention, the end plates have eight elongated and curved slots. The slots lie in an inner hole pattern that define a circle. This allows for an infinite amount of rotational positioning of adjacent beams in an end-to-end or in an end to side manner. The end plates also has four corner slots, which form an outer circular hole pattern. The four corner slots, which when combined with eight of the elongated slots, form a twelve outer hole pattern. The twelve outer hole pattern accordingly has holes that are each curved and are located on the perimeter of two concentric circles.

According to a still further advantage yet of the present invention, the junction of two beams can be laterally and/or longitudinally offset from the center of access holes.

Because of the above advantages, a still further advantage yet of the present invention is that there is a large degree of connectivity options (such as angular, lateral and longitudinal) that allow for very unique structures to be formed. It is appreciated that the structures can be of a temporary, semi-permanent or permanent nature.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
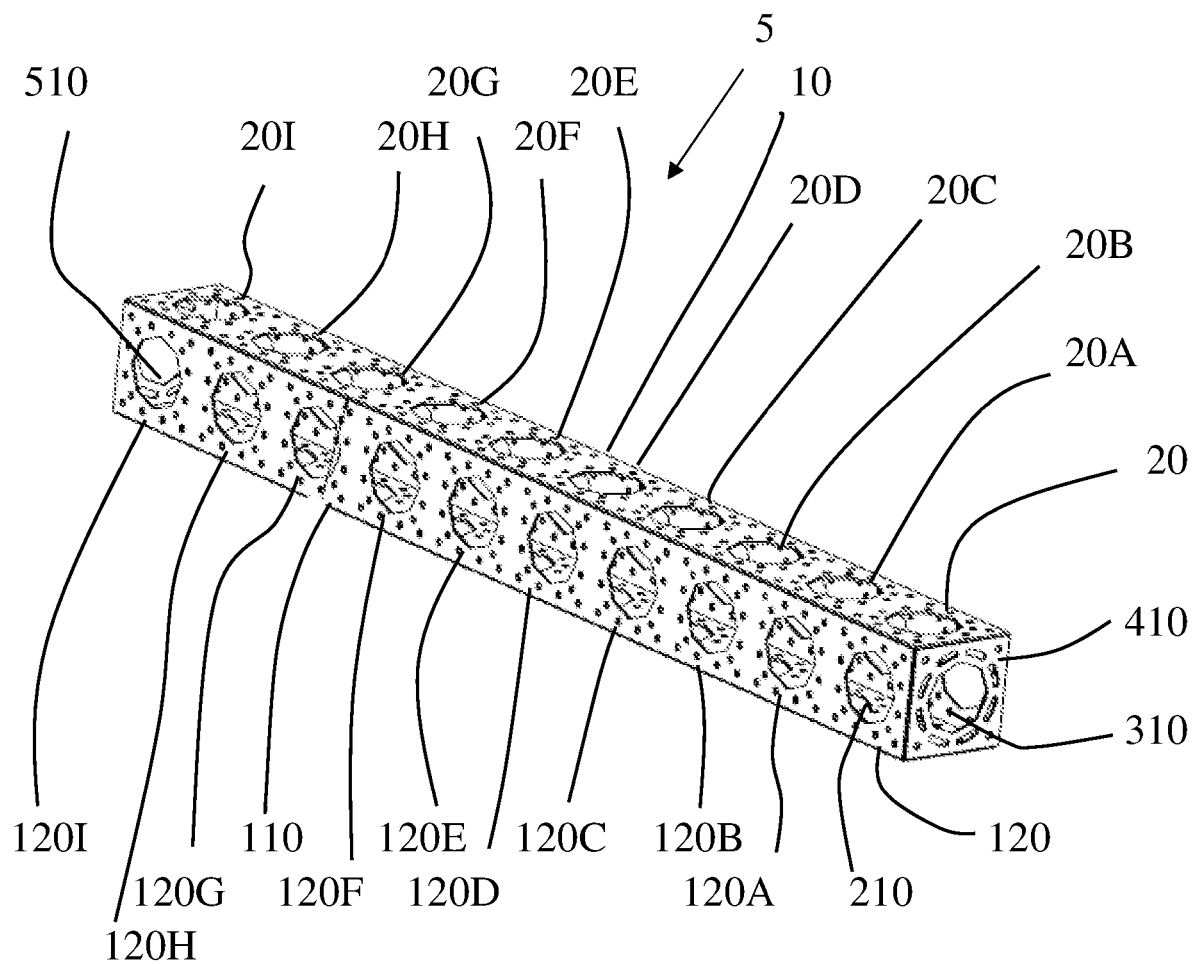
FIG. 1 is a perspective view of an embodiment of the present invention.
Figure 2:
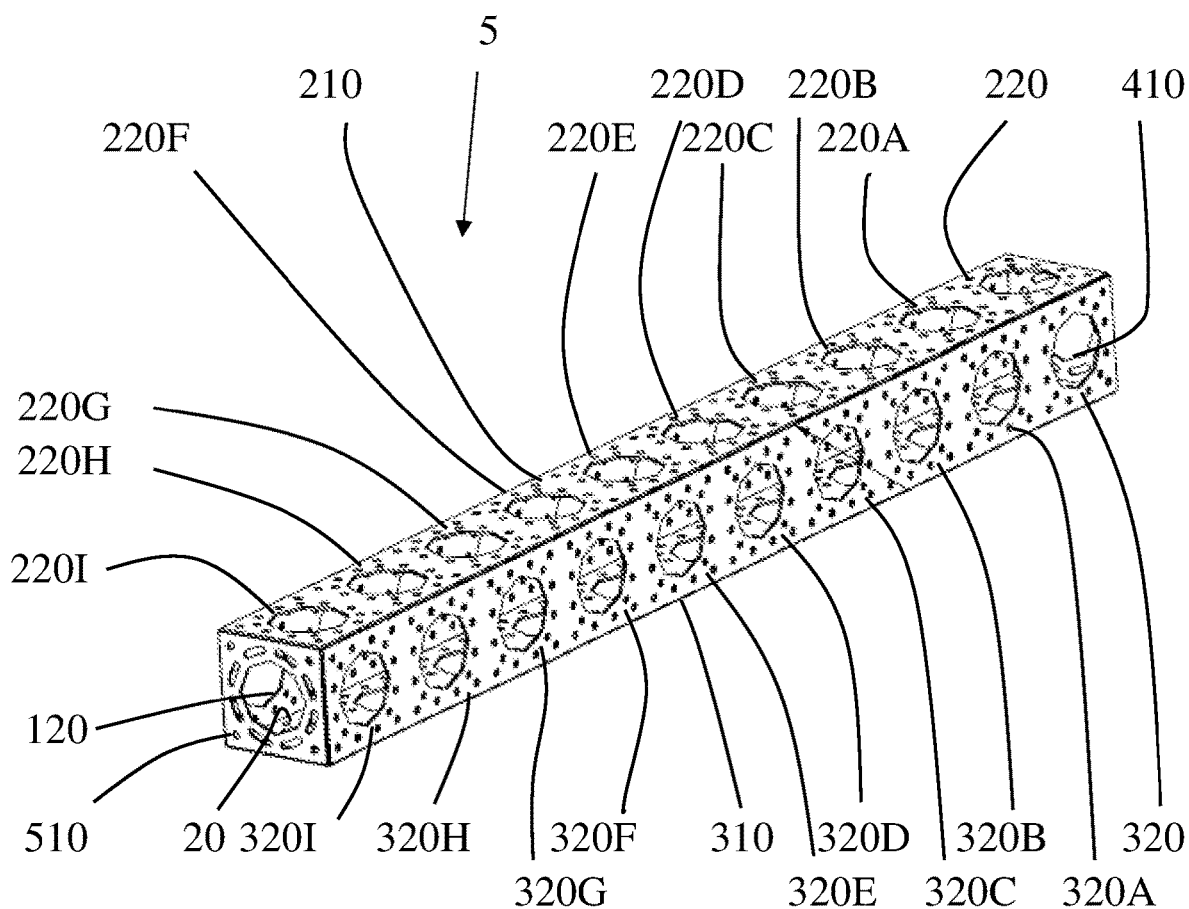
FIG. 2 is a reverse perspective view of the embodiment illustrated in FIG. 1.
Figure 3:
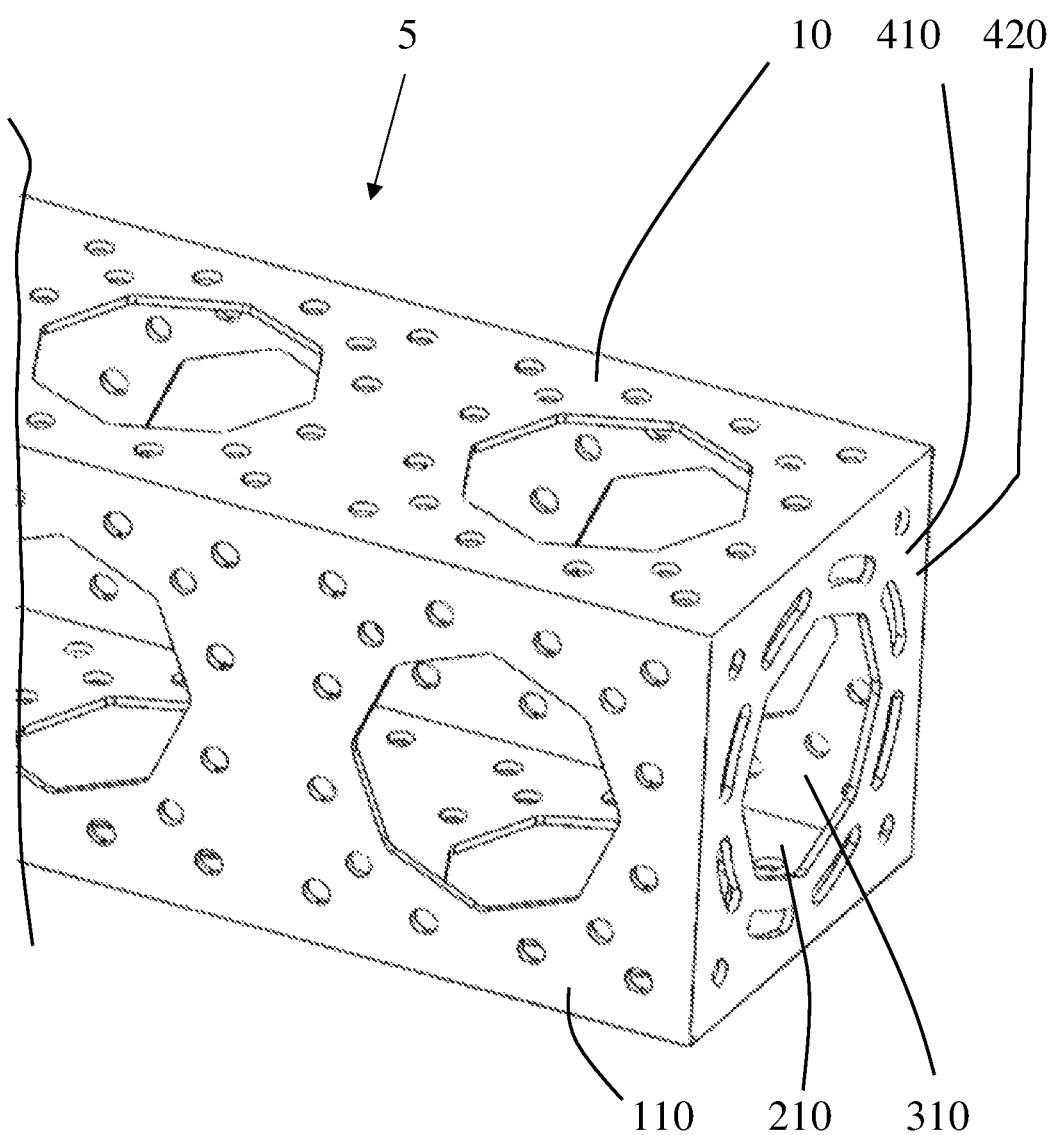
FIG. 3 is a close-up perspective view showing an end of the beam illustrated in FIG. 1.
Figure 4:
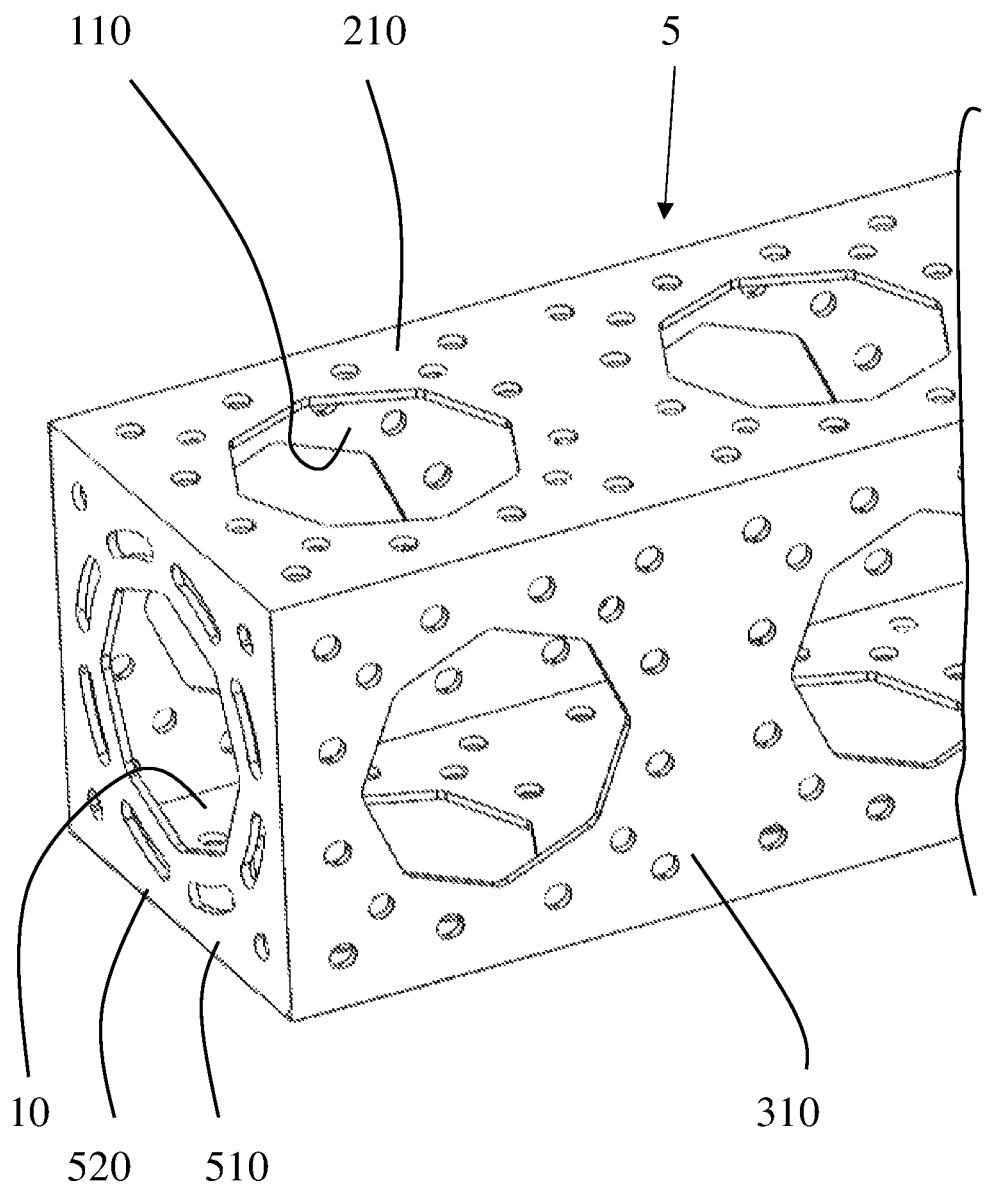
FIG. 4 is a close-up perspective view showing the opposite end of the beam illustrated in FIG. 1.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

An embodiment of the beam 5 present invention is illustrated in FIGS. 1-10. The beam 5 has four side plates 10, 110, 210 and 310, respectively. The beam 5 also has two end plates 410 and 510, respectively. The beam is preferably made of a strong material such as metal. It can be made of other materials, including but not limited to plastic and composites, without departing from the broad aspects of the present invention.

Side plate 10 has at least one section 20. In the embodiment illustrated in FIG. 1, side plate 10 has ten sections (20, 20A, 20B, 20C, 20D, 20E, 20F, 20G, 20H and 201, respectively). It is appreciated that the number of sections corresponds to the desired length of the beam. Accordingly, the side plate can have more or fewer sections than what is illustrated.

Figure 5:
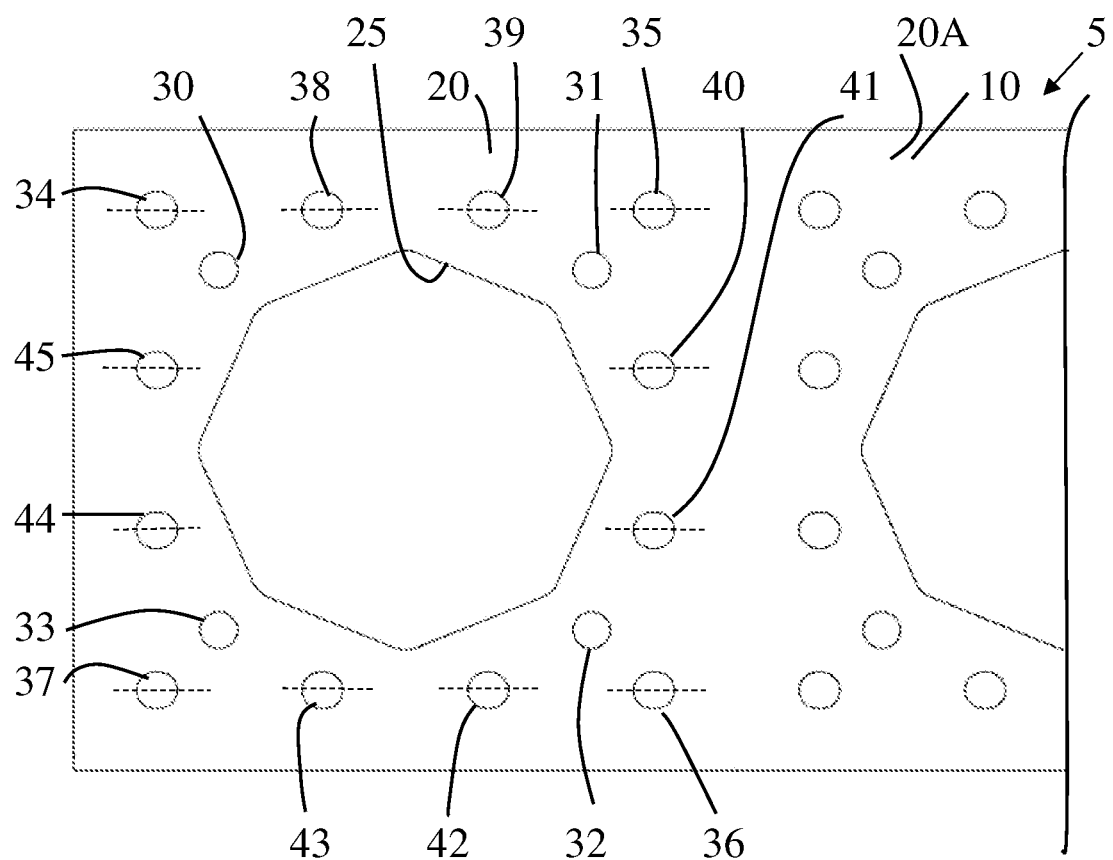
FIG. 5 is a partial view showing the end of a side plate.

Section 20 has a central access hole 25 as seen in FIG. 5. The access hole 25 preferably has a perimeter shape of an octagon. However, it can have different shapes without departing from the broad aspects of the present invention. Section 20 preferably has sixteen connection holes (30, 31, 32, 33, 34, 35, 36, 37, 38, 39, 40, 41, 42, 43, 44 and respectively). These sixteen holes are categorized as inner corner holes (30-33), outer corner holes (34-37) and side holes (38-45). Section 20 has connection hole pattern A formed of the inner corner holes (30-33), outer corner holes (34-37) and side holes (38-45). The outer corner holes 34-37 and the side holes 38-45 are slightly elongated into slots that are straight slots having longitudinal axes that are parallel to the beam longitudinal axis and perpendicular to the end plate planes. The inner corner holes 30-33 are preferably generally round in profile. Section 20 has an inner hole pattern and an outer hole pattern. Outer hole pattern has twelve holes, made of the outer corner holes 34-37 and the side holes 38-45. The outer hole pattern is preferably a square pattern. Inner hole pattern also has twelve holes, made of inner corner holes 30-33 and the side holes 38-45. The inner hole pattern is preferably a circular pattern. Each section of side plate 10 preferably has hole pattern A.

Side plate 110 has at least one section 120. In the embodiment illustrated in FIG. 1, side plate 110 has ten sections (120, 120A, 120B, 120C, 120D, 120E, 120F, 120G, 120H and 1201, respectively). It is appreciated that the number of sections corresponds to the desired length of the beam. Accordingly, the side plate can have more or fewer sections than what is illustrated.

Figure 6:
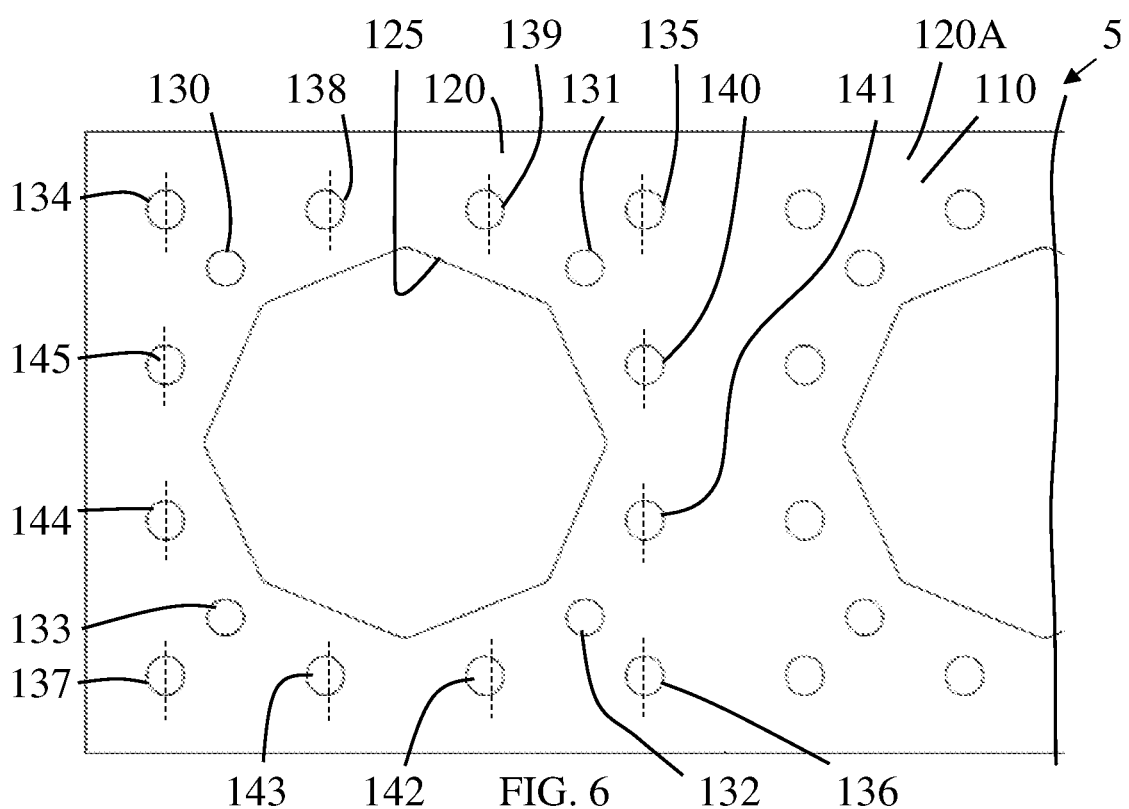
FIG. 6 is a partial view showing the end of a side plate.

Section 120 has a central access hole 125 as seen in FIG. 6. The access hole 125 preferably has a perimeter shape of an octagon. However, it can have different shapes without departing from the broad aspects of the present invention. Section 120 preferably has sixteen connection holes (130, 131, 132, 133, 134, 135, 136, 137, 138, 139, 140, 141, 142, 143, 144 and 145, respectively). These sixteen holes are categorized as inner corner holes (130-133), outer corner holes (134-137) and side holes (138-145). Section 120 has connection hole pattern B formed of the inner corner holes (130-133), outer corner holes (134-137) and side holes (138-145). The outer corner holes 134-137 and the side holes 138-145 are slightly elongated into slots that are straight slots having longitudinal axes that are perpendicular to the beam longitudinal axis and parallel to the end plate planes. The inner corner holes 130-133 are preferably generally round in profile. Section 120 has an inner hole pattern and an outer hole pattern. Outer hole pattern has twelve holes, made of the outer corner holes 134-137 and the side holes 138-145. The outer hole pattern is preferably a square pattern. Inner hole pattern also has twelve holes, made of inner corner holes 130-133 and the side holes 138-145. The inner hole pattern is preferably a circular pattern. Each section of side plate 110 preferably has hole pattern B.

Side plate 210 has at least one section 220. In the embodiment illustrated in FIG. 2, side plate 210 has ten sections (220, 220A, 220B, 220C, 220D, 220E, 220F, 220G, 220H and 2201, respectively). It is appreciated that the number of sections corresponds to the desired length of the beam. Accordingly, the side plate can have more or fewer sections than what is illustrated.

Figure 7:
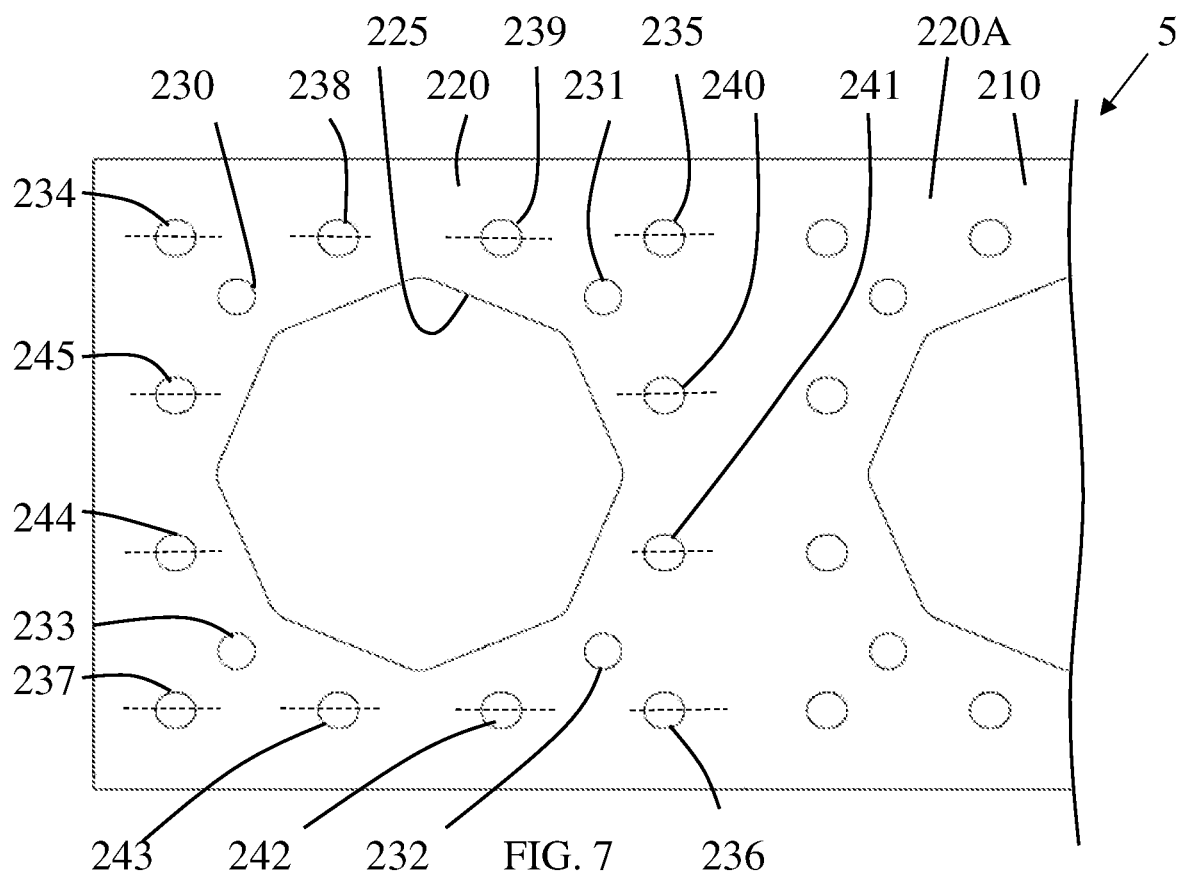
FIG. 7 is a partial view showing the end of a side plate.

Section 220 has a central access hole 225 as seen in FIG. 7. The access hole 225 preferably has a perimeter shape of an octagon. However, it can have different shapes without departing from the broad aspects of the present invention. Section 220 preferably has sixteen connection holes (230, 231, 232, 233, 234, 235, 236, 237, 238, 239, 240, 241, 242, 243, 244 and 245, respectively). These sixteen holes are categorized as inner corner holes (230-233), outer corner holes (234-237) and side holes (238-245). Section 220 has connection hole pattern A formed of the inner corner holes (230-233), outer corner holes (234-237) and side holes (238-245). The outer corner holes 234-237 and the side holes 238-245 are slightly elongated into slots that are straight slots having longitudinal axes that are parallel to the beam longitudinal axis and perpendicular to the end plate planes. The inner corner holes 230-233 are preferably generally round in profile. Section 220 has an inner hole pattern and an outer hole pattern. Outer hole pattern has twelve holes, made of the outer corner holes 234-237 and the side holes 238-245. The outer hole pattern is preferably a square pattern. Inner hole pattern also has twelve holes, made of inner corner holes 230-233 and the side holes 238-245. The inner hole pattern is preferably a circular pattern. Each section of side plate 210 preferably has hole pattern A.

Side plate 310 has at least one section 320. In the embodiment illustrated in FIG. 2, side plate 310 has ten sections (320, 320A, 320B, 320C, 320D, 320E, 320F, 320G, 320H and 320I, respectively). It is appreciated that the number of sections corresponds to the desired length of the beam. Accordingly, the side plate can have more or fewer sections than what is illustrated.

Figure 8:
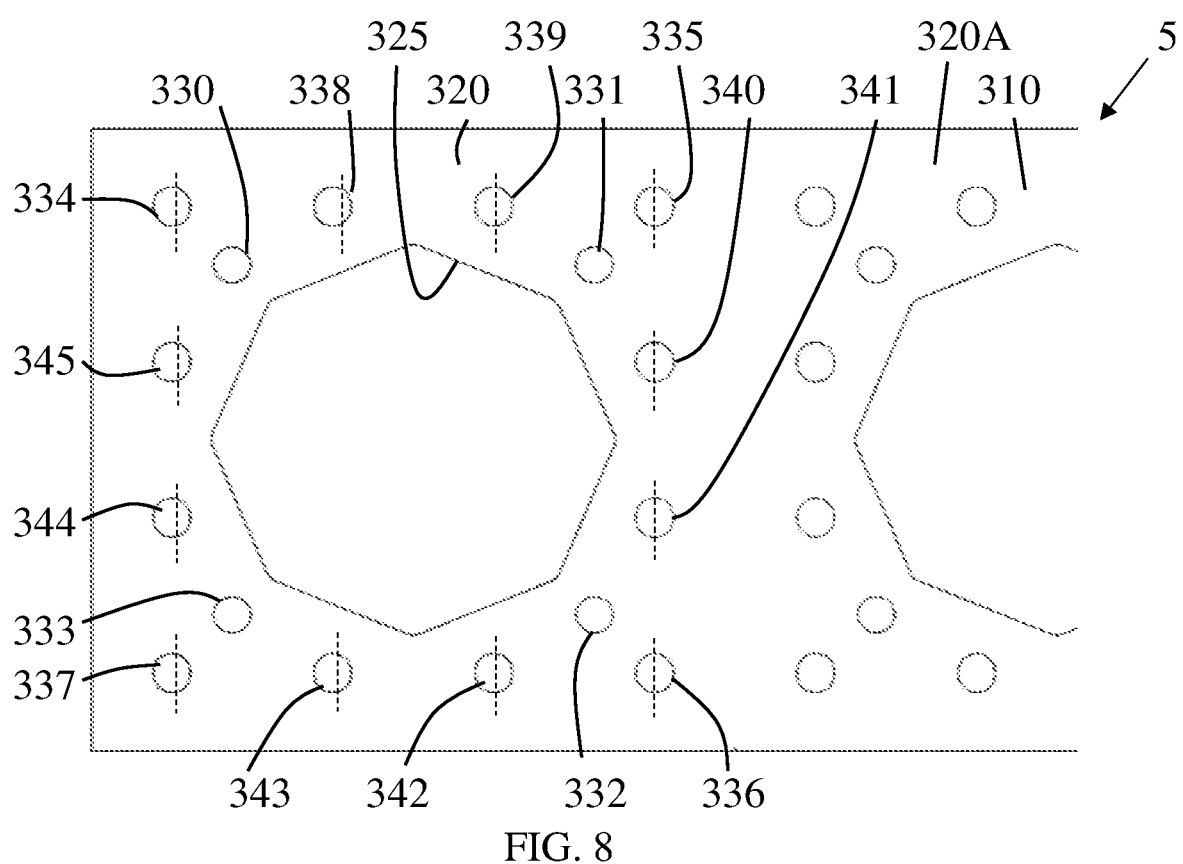
FIG. 8 is a partial view showing the end of a side plate.

Section 320 has a central access hole 325 as seen in FIG. 8. The access hole 325 preferably has a perimeter shape of an octagon. However, it can have different shapes without departing from the broad aspects of the present invention. Section 320 preferably has sixteen connection holes (330, 331, 332, 333, 334, 335, 336, 337, 338, 339, 340, 341, 342, 343, 344 and 345, respectively). These sixteen holes are categorized as inner corner holes (330-333), outer corner holes (334-337) and side holes (338-345). Section 320 has connection hole pattern B formed of inner corner holes (330-333), outer corner holes (334-337) and side holes (338-345). The outer corner holes 334-337 and the side holes 338-345 are slightly elongated into slots that are straight slots having longitudinal axes that are perpendicular to the beam longitudinal axis and parallel to the end plate planes. The inner corner holes 330-333 are preferably generally round in profile. Section 320 has an inner hole pattern and an outer hole pattern. Outer hole pattern has twelve holes, made of the outer corner holes 334-337 and the side holes 338-345. The outer hole pattern is preferably a square pattern. Inner hole pattern also has twelve holes, made of inner corner holes 330-333 and the side holes 338-345. The inner hole pattern is preferably a circular pattern. Each section of side plate 310 preferably has hole pattern B.

The inner corner holes of side plates 10, 110, 210 and 310 can be used to align with tube truss. The outer corner holes and side holes can have slots with long dimensions of about 0.75 inches and short dimensions of about 0.69 inches. The longitudinal axis of the slots is represented with dashed lines in FIGS. 5-8. It is appreciated that alternative dimensions could be used without departing from the broad aspects of the present invention. Also, the outer hole pattern holes within each section are preferably spaced apart about 3 inches on center. Yet, it is appreciated that alternative spacing could be used without departing from the broad aspects of the present invention.

Figure 9:
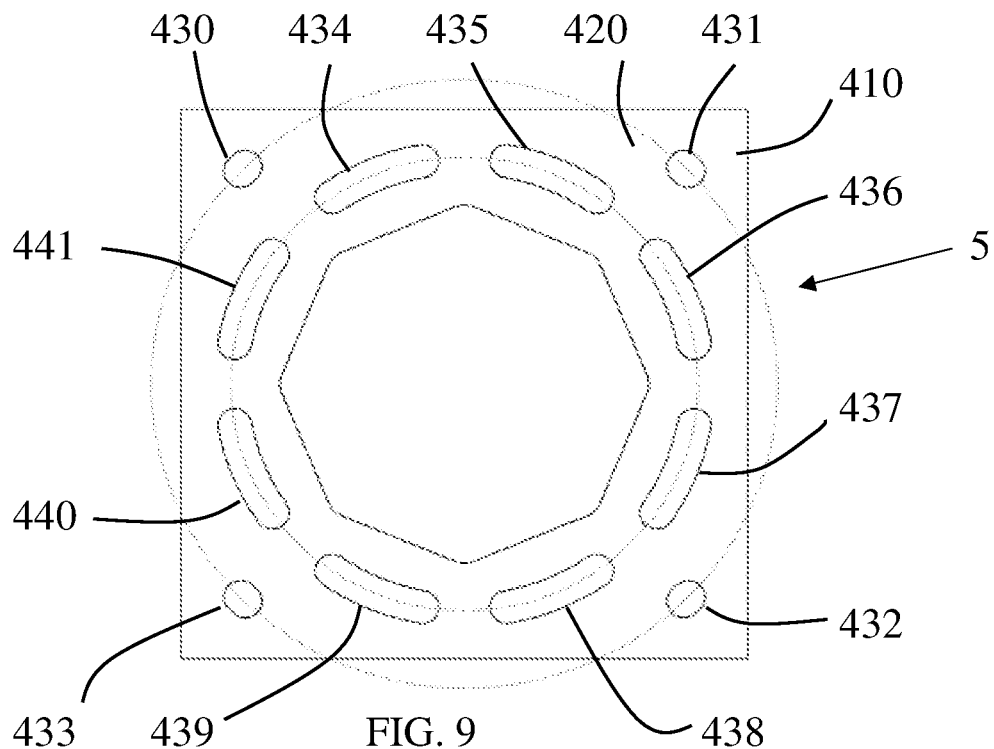
FIG. 9 is an end view of the embodiment illustrated in FIG. 1.

End plate 410 preferably has one section 420, as seen in FIG. 9. Section 420 has a central access hole 425. The access hole 425 preferably has a perimeter shape of an octagon. However, it can have different shapes without departing from the broad aspects of the present invention. Section 420 preferably has twelve connection holes (430, 431, 432, 433, 434, 435, 436, 437, 438, 439, 440, 441, respectively). These holes are categorized as corner holes (430-433) and side holes (434-441). Section 420 has connection hole pattern C formed of corner holes (430-433) and side holes (434-441). The holes are elongated (corner holes being slightly elongated, and side holes being substantially elongated) into slots that are curved slots. Corner holes 430-433 preferably are oriented to lie in an outer circle. The curvature of the slots are concentric with the outer circle. Side holes 434-441 preferably are oriented to lie in an inner circle. The curvature of the slots is concentric with the outer circle. The inner circle preferably has the same center point as the outer circle. Section 420 has an inner hole pattern that is circular and an outer hole pattern that is square. Outer hole pattern has twelve holes including all of the corner holes 430-433 and all of the side holes 434-441. In this regard, all of the holes have a portion thereof that are in the outer hole pattern. Inner hole pattern is the pattern defined by the side holes 434-441. It is appreciated that a third hole pattern as described above with the corner holes is also provided. Each of the eight substantially elongated side slots is preferably aligned radially centered with an edge of the octagon perimeter of the access hole 425. Each of the slightly elongated corner slots is located in a corner of the section 420.

Figure 10:
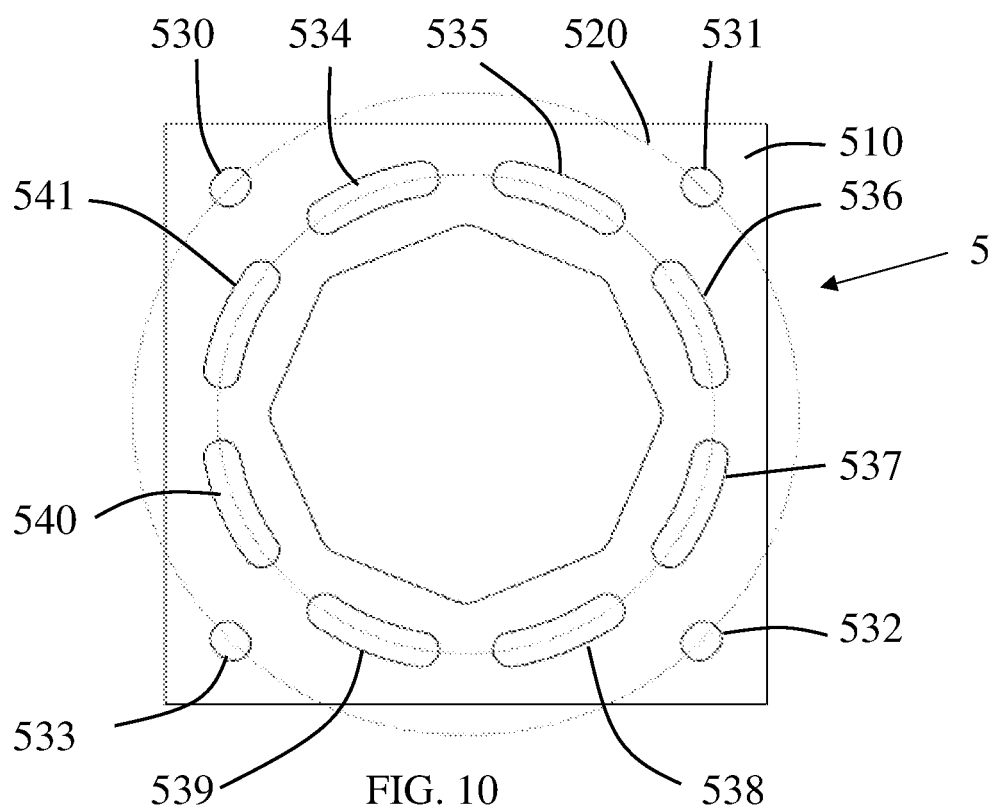
FIG. 10 is an opposite end view of the embodiment illustrated in FIG. 1.

End plate 510 preferably has one section 520, as seen in FIG. 10. Section 520 has a central access hole 525. The access hole 525 preferably has a perimeter shape of an octagon. However, it can have different shapes without departing from the broad aspects of the present invention. Section 520 preferably has twelve connection holes (530, 531, 532, 533, 534, 535, 536, 537, 538, 539, 540, 541, respectively). These holes are categorized as corner holes (530-533) and side holes (534-541). Section 520 has connection hole pattern C formed of corner holes (530-533) and side holes (534-541). The holes are elongated (corner holes being slightly elongated, and side holes being substantially elongated) into slots that are curved slots. Corner holes 530-533 have a hole pattern that is preferably an outer circle. The curvature of the slots are concentric with the outer circle. Side holes 534-541 have a hole pattern that is preferably an inner circle. The curvature of the slots is concentric with the outer circle. The inner circle preferably has the same center point as the outer circle. Section 520 has an inner hole pattern that is circular and an outer hole pattern that is square. Outer hole pattern has twelve holes including all of the corner holes 530-533 and all of the side holes 534-541. In this regard, all of the holes have a portion thereof that are in the outer hole pattern. Inner hole pattern is the pattern defined by the side holes 534-541. It is appreciated that a third hole pattern as described above with the corner holes is also provided. Each of the eight substantially elongated side slots is preferably aligned radially centered with an edge of the octagon perimeter of the access hole 525. Each of the slightly elongated corner slots is located in a corner of the section 520.

The slightly elongated corner holes of the end plates can have lengths of about 0.81 inches. The substantially elongated side holes of the end plates can have lengths of about 2.67 inches. Yet, it is appreciated that other lengths could be used without departing from the broad aspects of the present invention.

Figure 11:
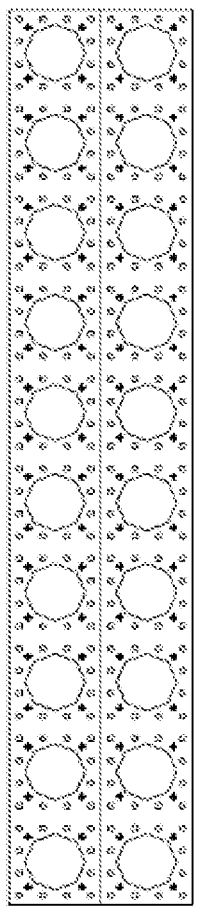
FIG. 11 is a perspective view of a sheet.
Figure 12:
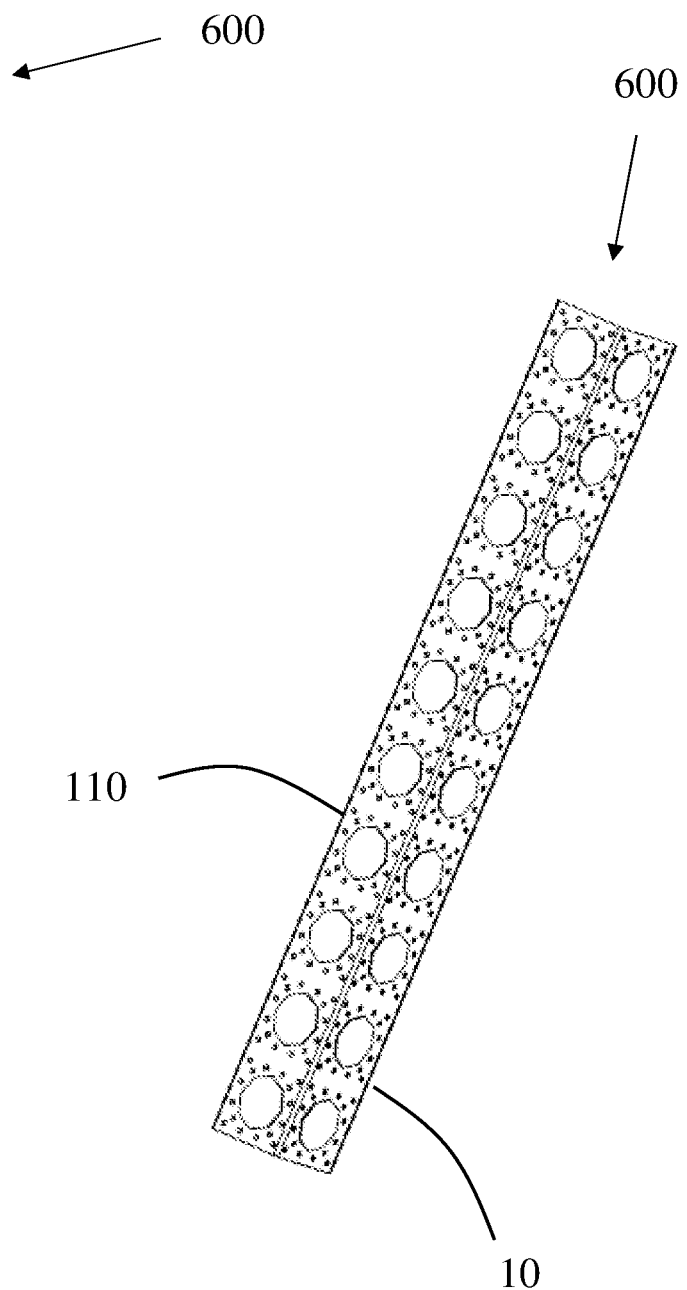
FIG. 12 is a perspective view of the sheet illustrated in FIG. 11 bent to form two side plates.
Figure 13:
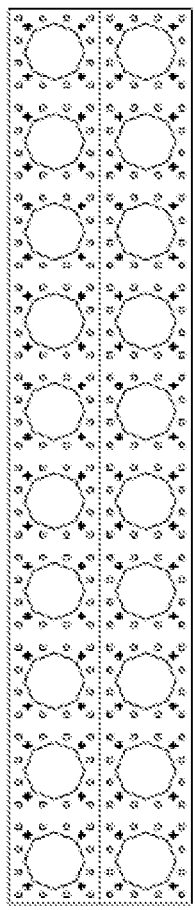
FIG. 13 is a perspective view of a sheet.
Figure 14:
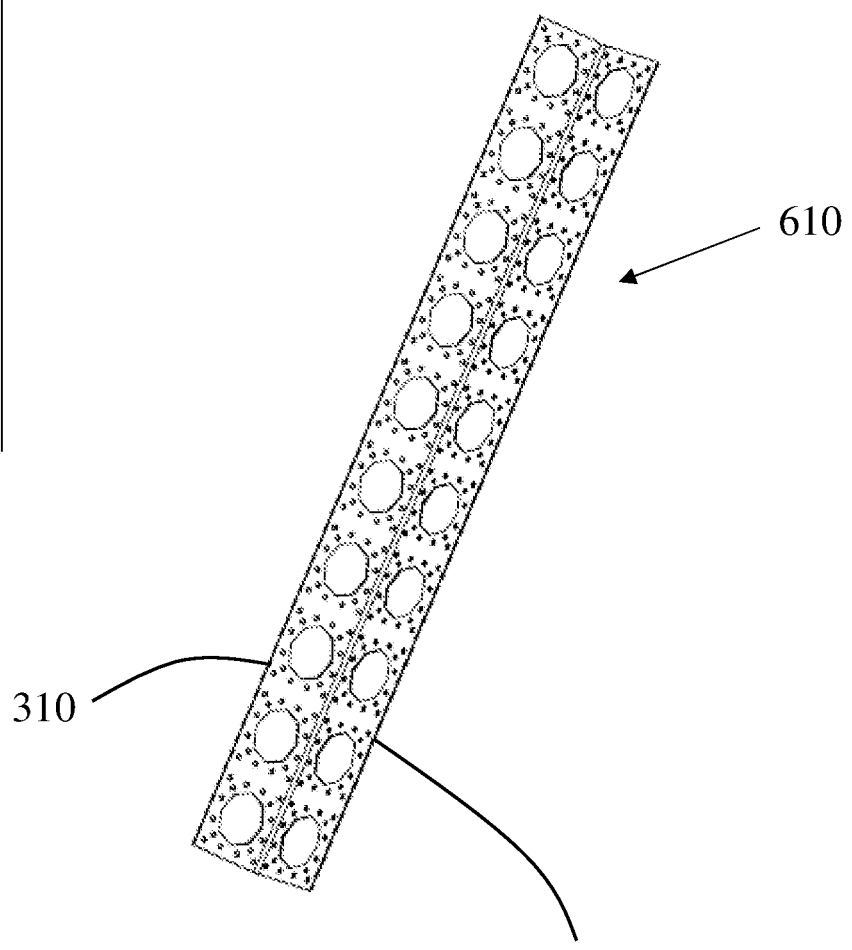
FIG. 14 is a perspective view of the sheet illustrated in FIG. 13 bent to form two side plates.

The manufacturing process for rectangular structural building member, or beam 5, in a preferred embodiment includes laser cutting or punch pressing the design into raw material. This can be accomplished by providing a first sheet 600 (FIG. 11) and forming holes in it (which will become access holes and connection holes). It is appreciated that the sheet 600 will contain two strips of sections, one having pattern A and the other having pattern B. Then, once the holes are formed, the sheet 600 is bent to form sides 10 and 110 as seen in FIG. 12. A second sheet 610 (FIGS. 13 and 14) similarly has holes formed in it and is then bent to form sides 210 and 310. The two sides of each sheet are preferably perpendicular to each other. Then, two of the bent sheets 600 and 601 can be joined, preferably by welding, to form a four-sided structure with two distinct hole patterns (two pattern A and two pattern B, the same patterns being on opposite sides of the four-sided structure). Then, end plates 410 and 510 can be welded on the ends.

It is appreciated that the length of the sheets can determine the number of sections on the assembled beam.

Now that the beam 5 has been described, a structure 700 can be formed by joining multiple beams. The beams are preferably joined with fasteners 800 such as bolts. Washers are preferably used with the bolts. It is appreciated that other fasteners may be used without departing from the broad aspects of the present invention.

Figure 15:
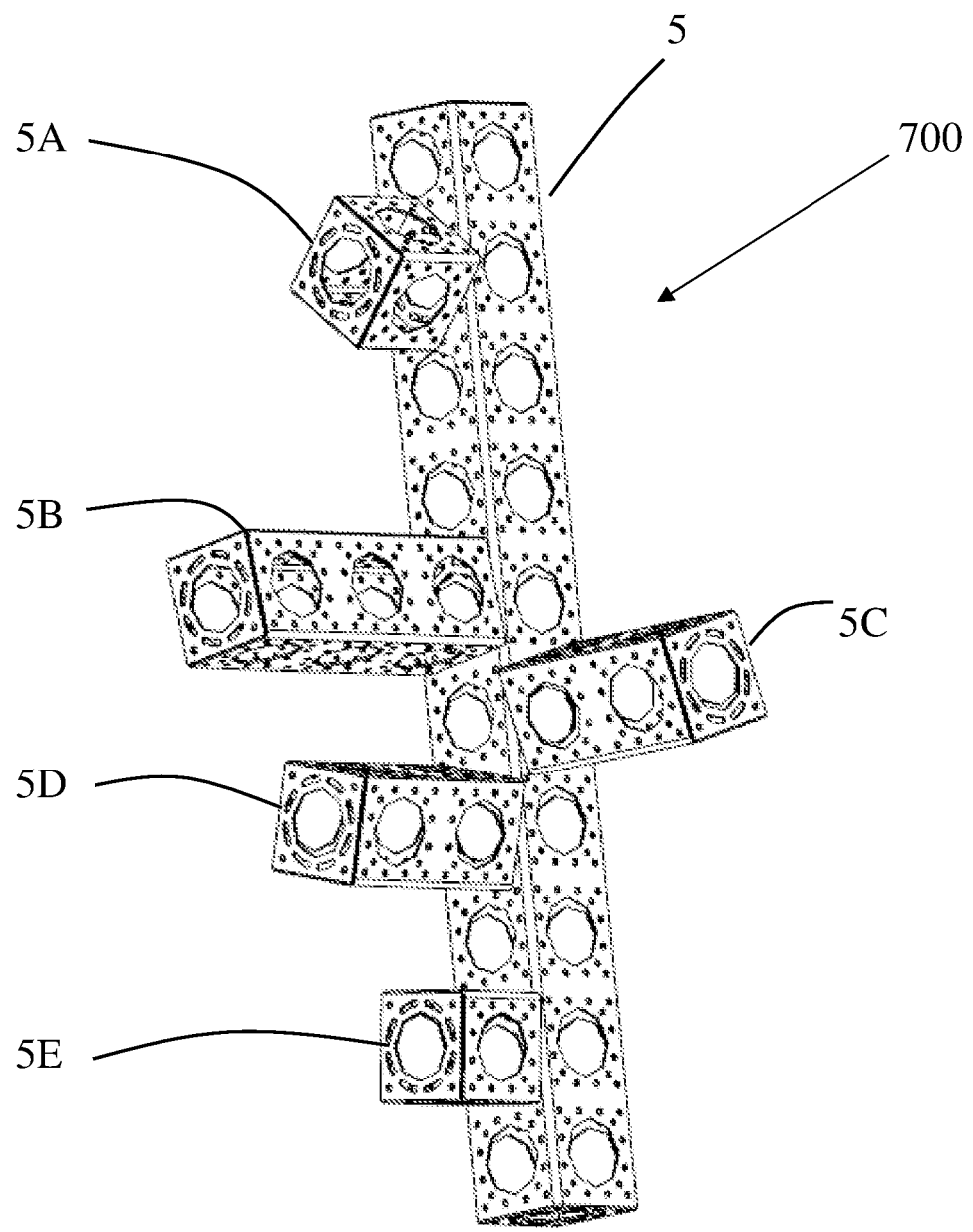
FIG. 15 is a perspective view of a structure.
Figure 16:
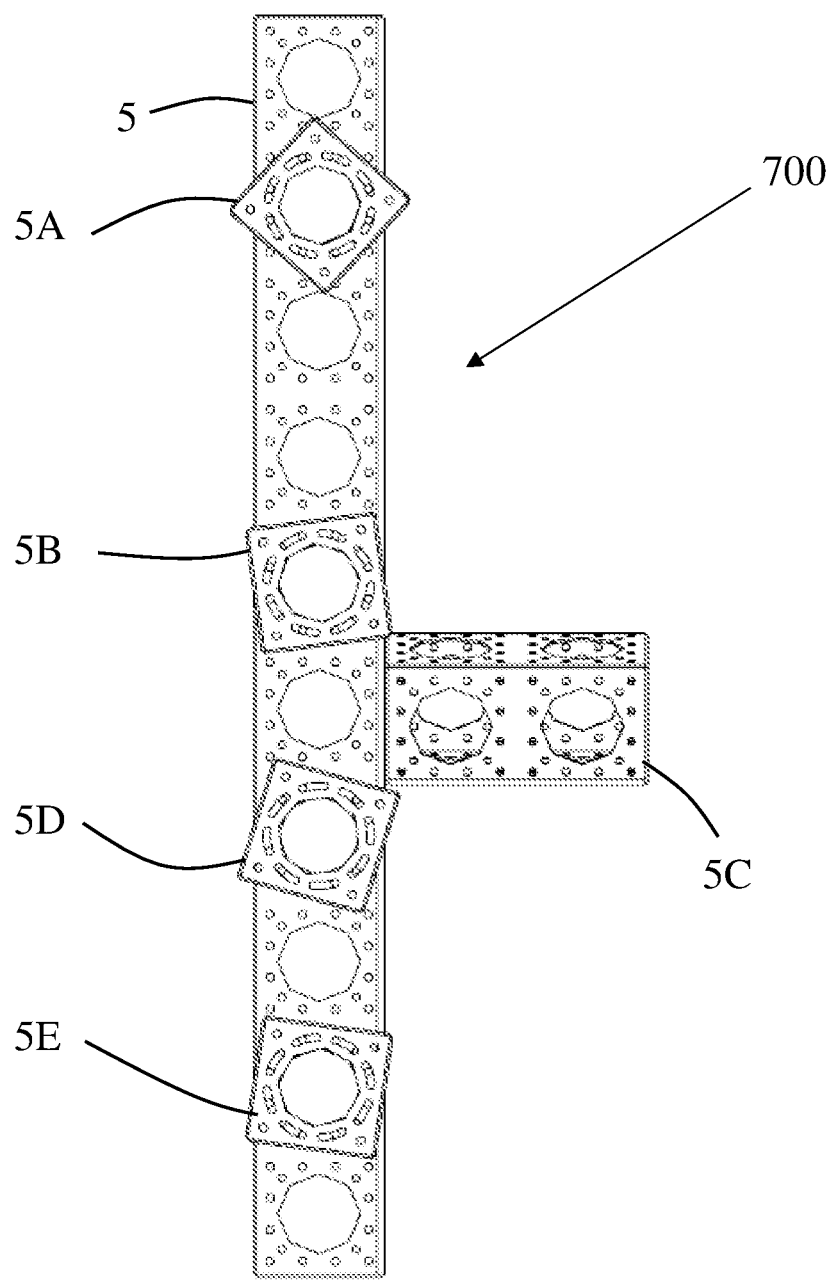
FIG. 16 is an alternative view of the structure formed in FIG. 15.
Figure 17:
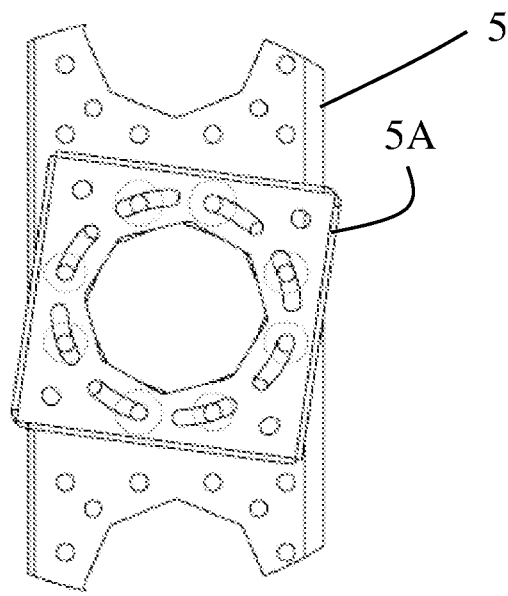
FIG. 17 is a partial side view showing a connection of two beams in an end to side configuration.
Figure 18:
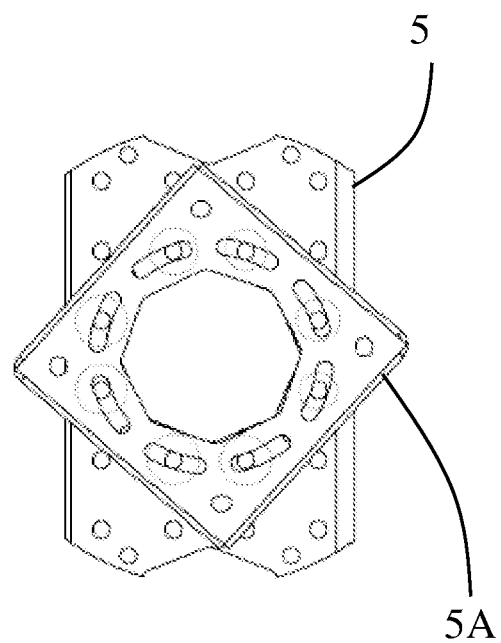
FIG. 18 is a partial side view showing a connection of two beams in an end to side configuration.
Figure 19:
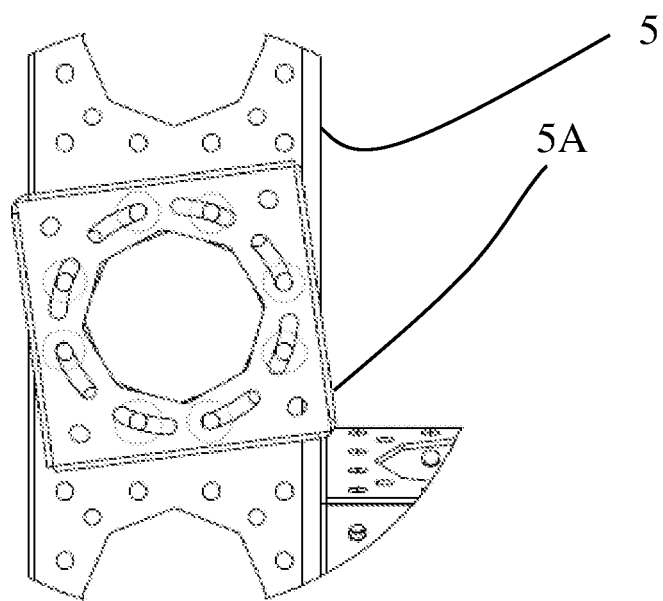
FIG. 19 is a partial side view showing a connection of two beams in an end to side configuration.
Figure 20:
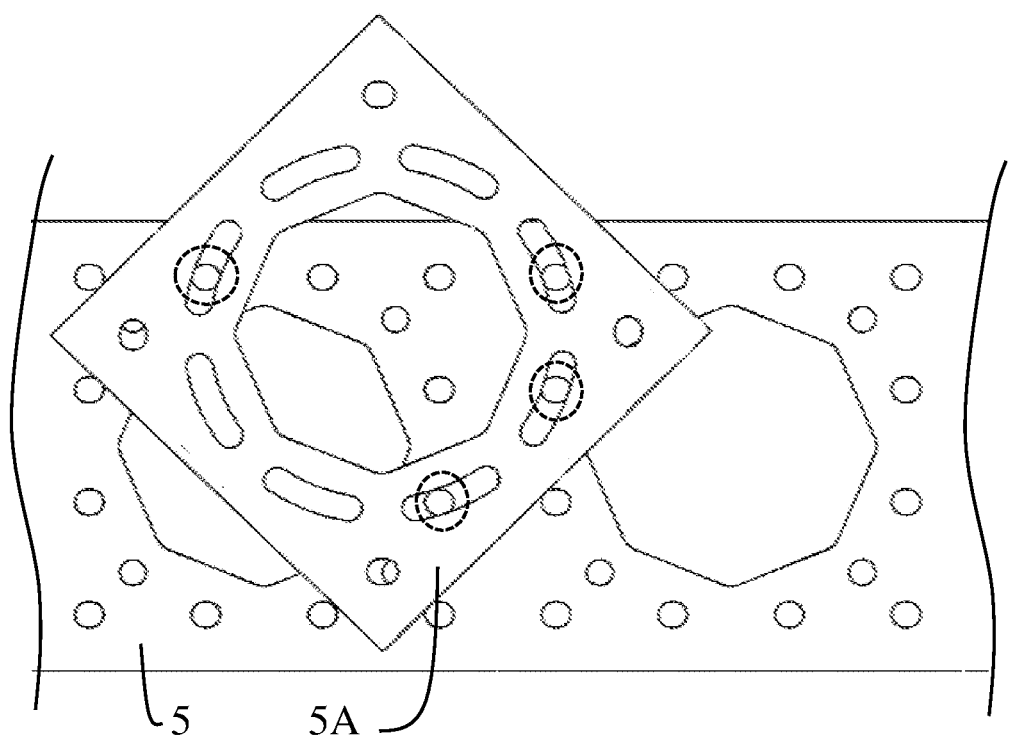
FIG. 20 is a partial side view showing a connection of two beams in an end to side configuration.
Figure 21:
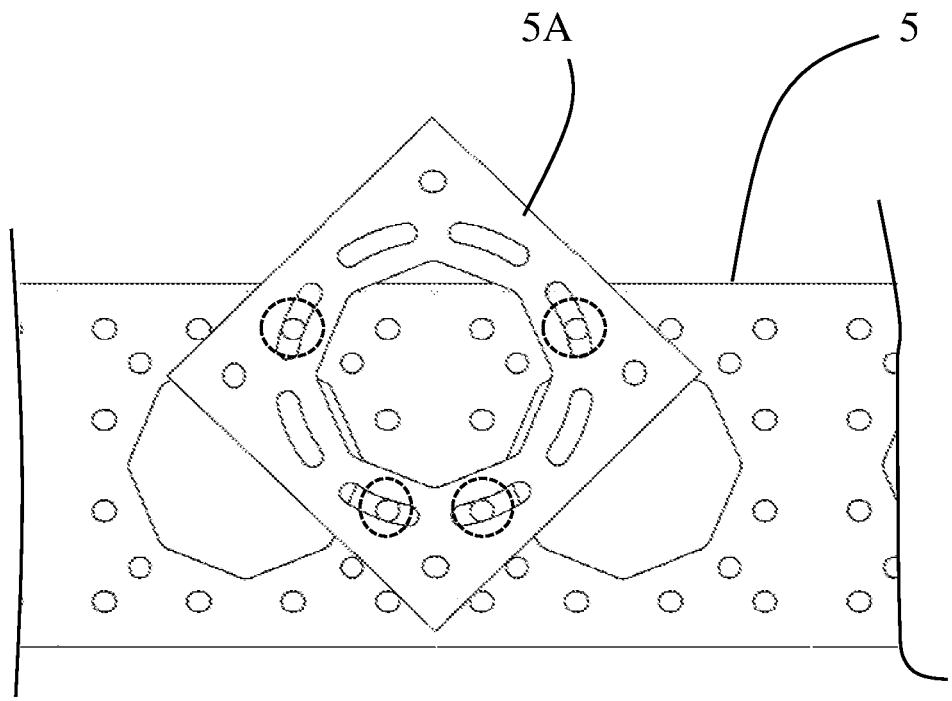
FIG. 21 is a partial side view showing a connection of two beams in an end to side configuration.
Figure 22:
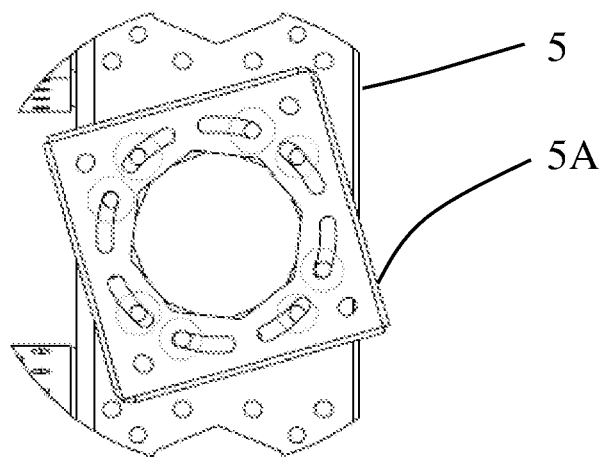
FIG. 22 is a partial side view showing a connection of two beams in an end to side configuration.
Figure 23:
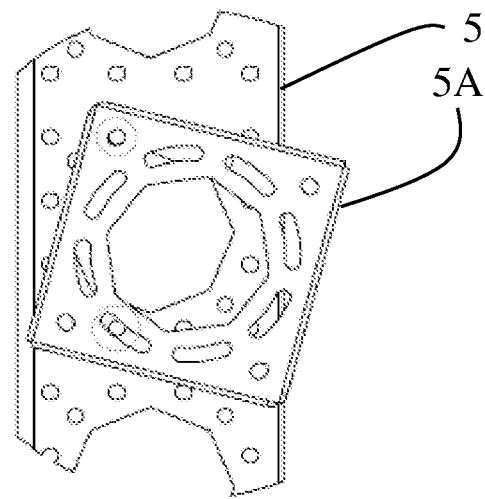
FIG. 23 is a partial side view showing a connection of two beams in an end to side configuration.
Figure 24:
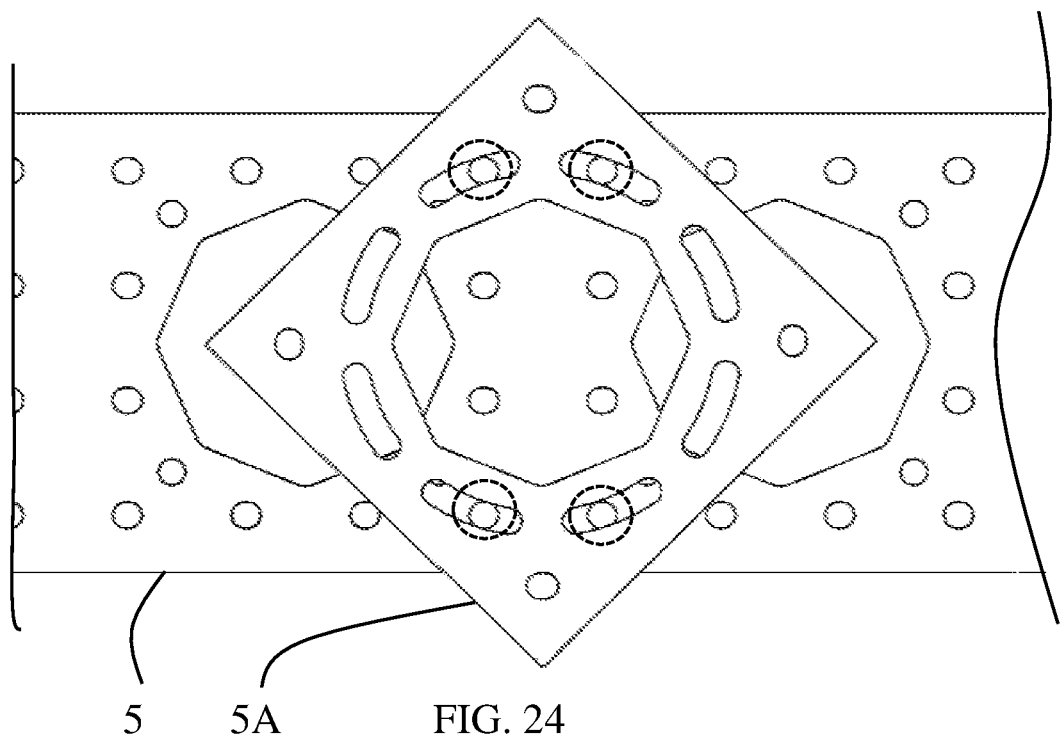
FIG. 24 is a partial side view showing a connection of two beams in an end to side configuration.
Figure 25:
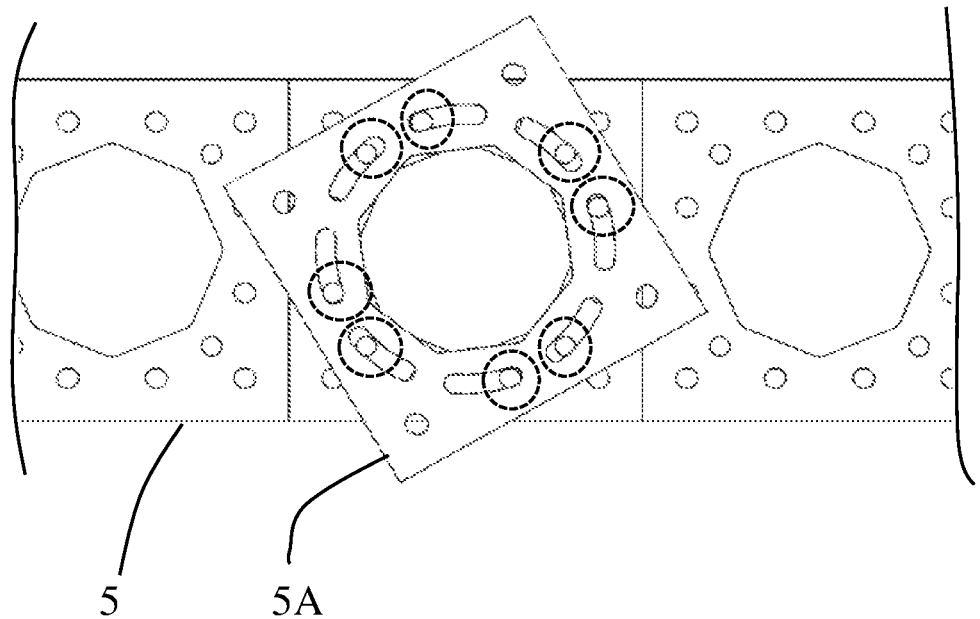
FIG. 25 is a partial side view showing a connection of two beams in an end to side configuration.
Figure 26:
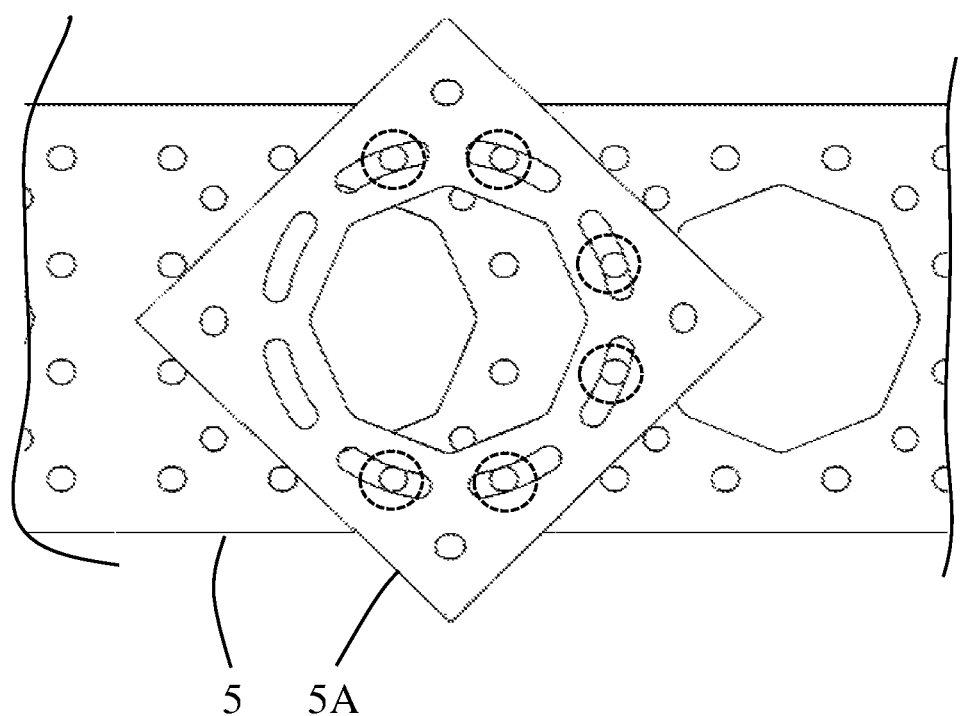
FIG. 26 is a partial side view showing a connection of two beams in an end to side configuration.
Figure 27:
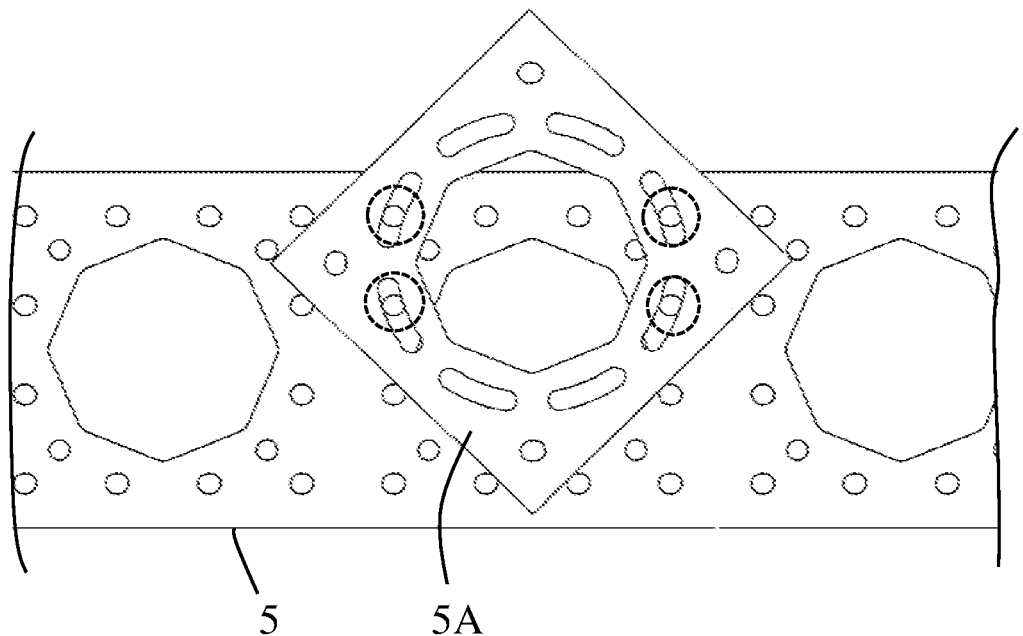
FIG. 27 is a partial side view showing a connection of two beams in an end to side configuration.
Figure 28:
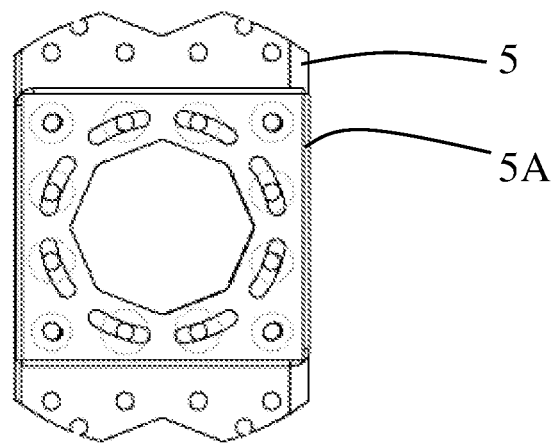
FIG. 28 is a partial side view showing a connection of two beams in an end to side configuration.
Figure 29:
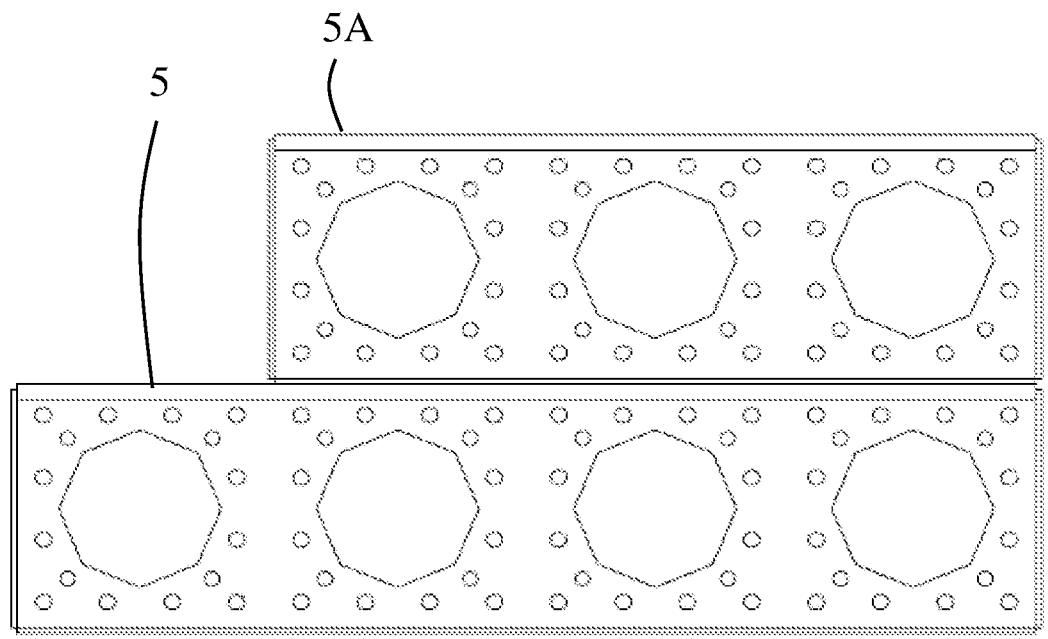
FIG. 29 is a top view showing a connection of two beams in a side-to-side configuration.

Turning to FIGS. 15 and 16, it is seen that a structure 700 is formed. The structure 700 has beam 5, 5A, 5B, 5C, 5D and 5E. This is an example of end to side connection. FIGS. 15 and 16 further illustrate beams of various length and various connection configurations (rotational, lateral and longitudinal offsets).

Looking now at FIGS. 17-28, several examples of the various connection configurations are illustrated showing the vast manner in which connection holes can be aligned between beam 5 and beam 5A. The beams can be connected in a side to end manner with three independent flexibilities of connection (rotational and two linear offset directions). The figures are marked with a circle where a fastener can join the beams. A preferred faster is a bolt.

Turning now to FIGS. 29 and 31-33, it is seen that beams 5 and 5A can be connected side-to-side as well. The beams can be longitudinally offset in ¼ section length increments as there are four outer perimeter holes on the top and bottom edge of each section. The beams 5 and 5A can also be rotationally and laterally offset. The beams can have three independent flexibilities of connection (rotational and two linear offset directions). Ends of bolts 800 are shown in several locations where connection holes of beams 5 and 5A overlap.

Figure 30:
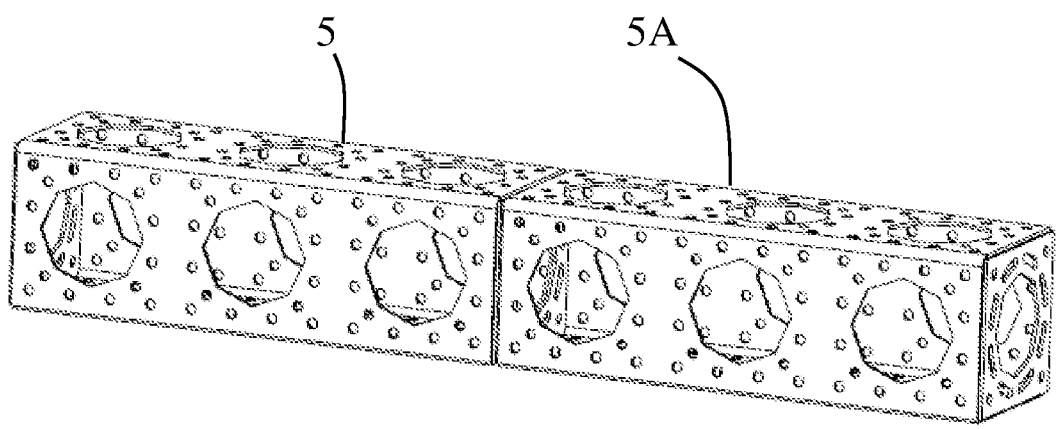
FIG. 30 is perspective view showing two beams connected in an end-to-end configuration.
Figure 31:
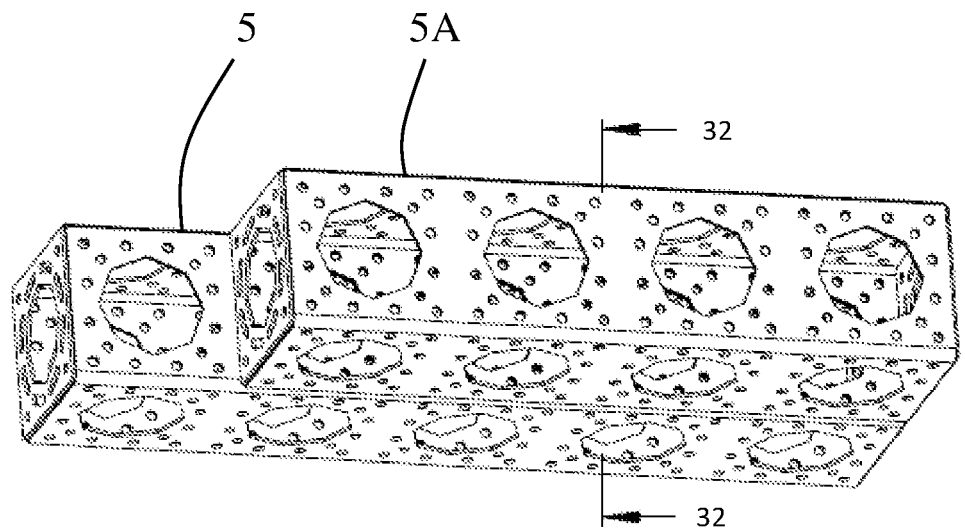
FIG. 31 is a perspective view showing a connection of two beams in a side-to-side configuration.
Figure 32:
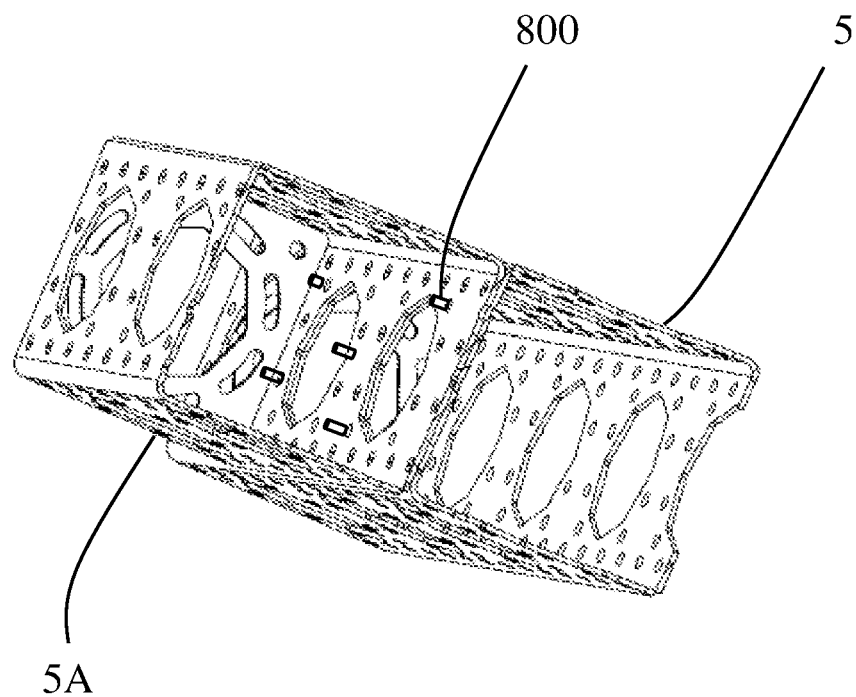
FIG. 32 is cross-sectional view taken along line 32-32 in FIG. 31.

FIG. 30 illustrated a how two beams can be connected in an end-to-end manner to form an elongated beam. The beams can be angularly rotated relative to each other. The beams can also be connected wherein their respective longitudinal axis are offset and parallel resulting in three independent flexibilities of connection (rotational and two linear offset directions).

Figure 33:
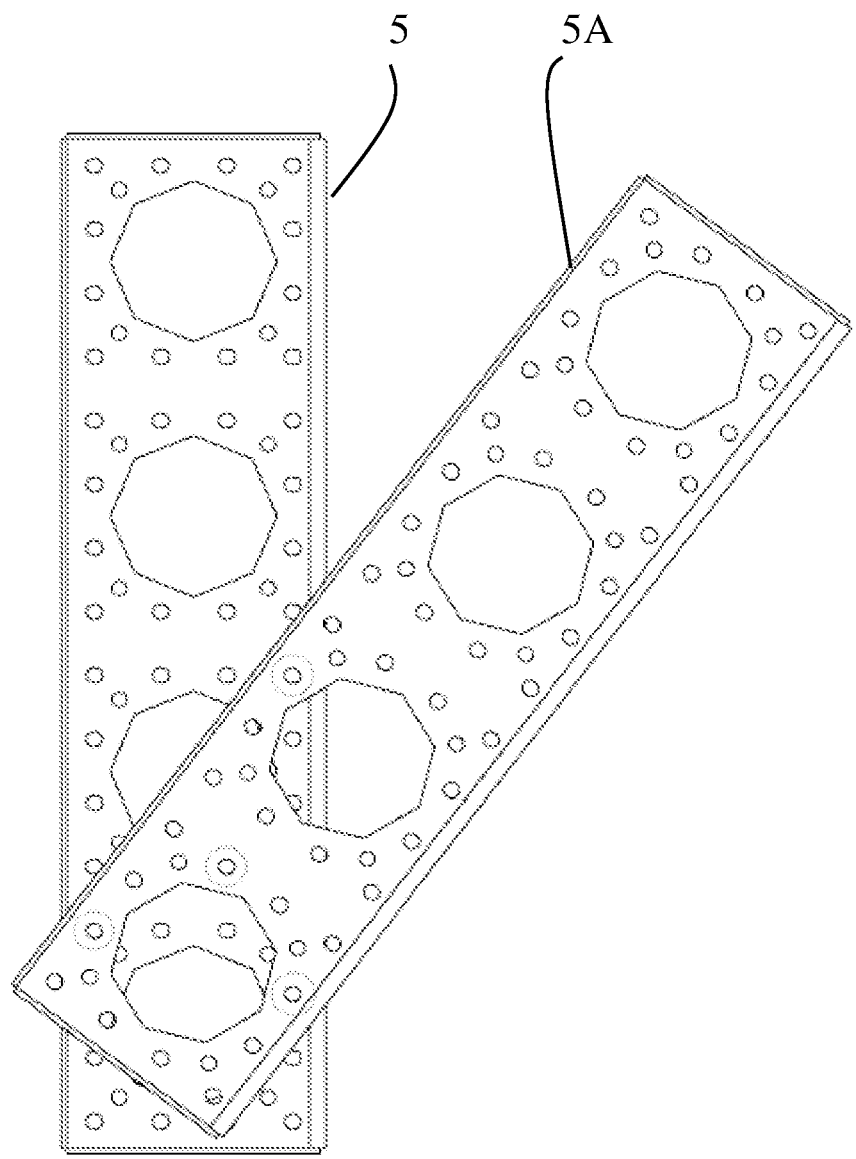
FIG. 33 is a side view showing two beans joined in a side-to-side manner in an angularly offset manner.
Figure 34:
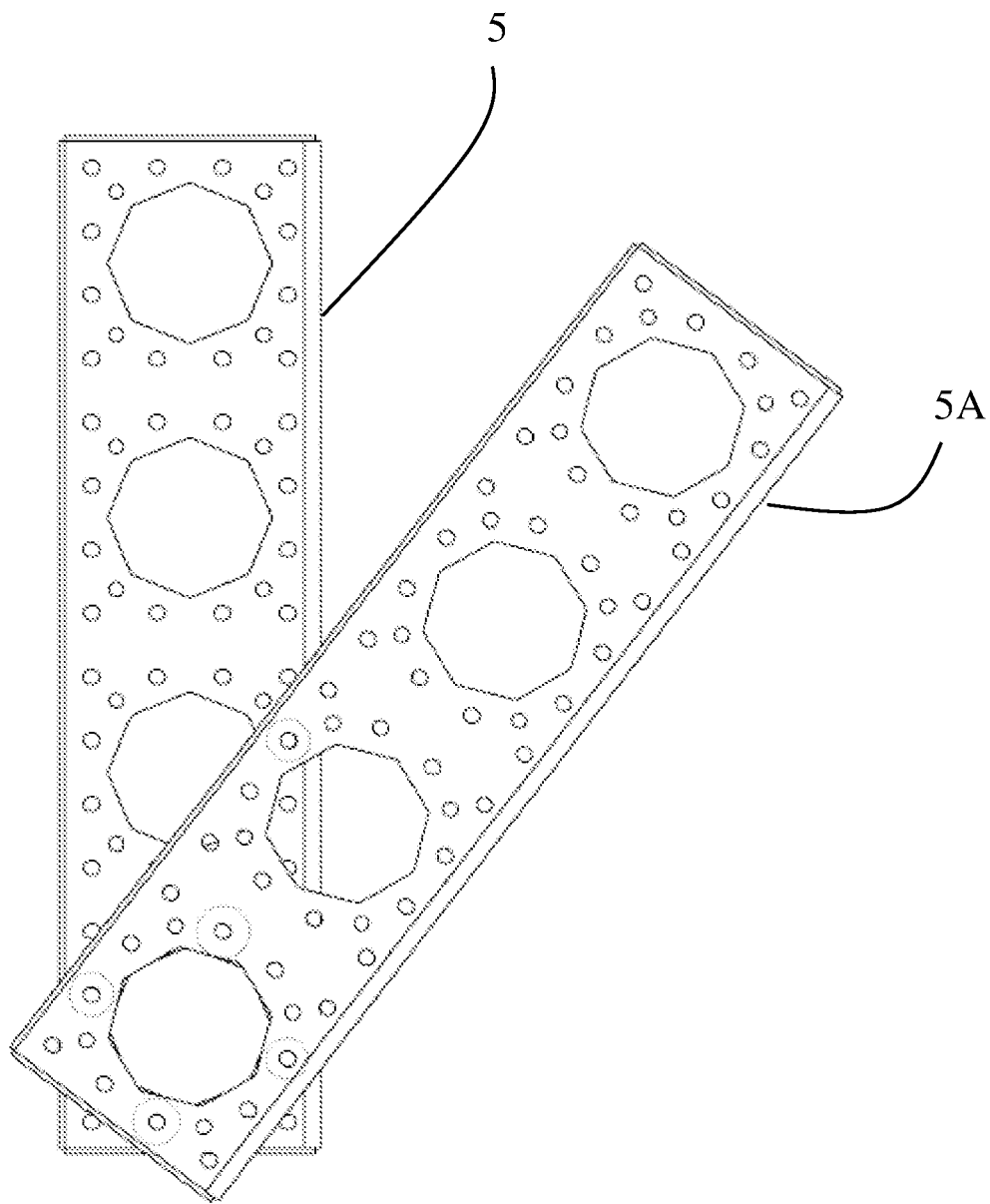
FIG. 34 is a side view showing two beans joined in a side-to-side manner in an angularly offset manner.

FIG. 33 illustrates an angular offset of two beams fastened in a side-to-side manner. In this regard, because of the twelve holes of the inner hole patterns, there are twelve rotational orientations that can be made between the beams.

It is appreciated that sides with pattern A are preferably joined with sides having hole pattern B, as each hole pattern has increased tolerance in perpendicular directions, with results in a large connection tolerance when both directions are represented at a single junction.

Figure 35:
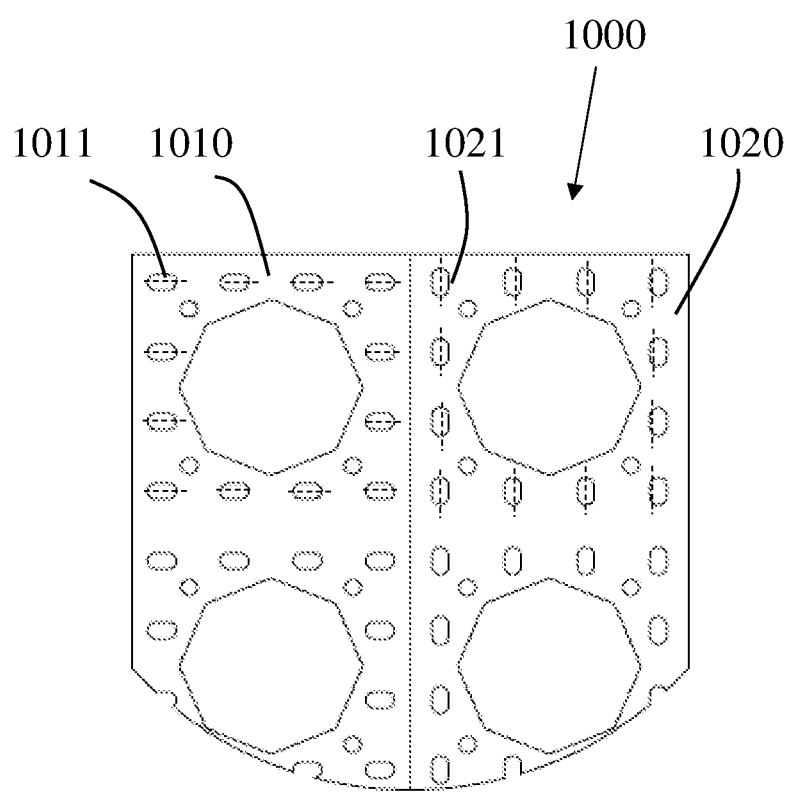
FIG. 35 is a partial side view of a sheet showing elongated side plate slots.

Looking now at FIG. 35, it is seen that a sheet 1000 is provided. The sheet can be formed into a side plate 1010 having connection holes 1011 and a side plate 1020 having connection holes 1021. The connection holes 1011 and 1022 about their respective outer section perimeters that are elongated in their long dimension relative to their short dimension. It is appreciated that holes 1011 and preferably oriented along axis that are perpendicular to the axis of holes 1021. The respective inner corner holes are preferably circular.

Thus, it is apparent that there has been provided, in accordance with the invention, a beam with improve hole patterns that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A beam comprising:
    a first side plate having a first side plate section, said first side plate section having a hole pattern A;
    a second side plate having a second side plate section, said second side plate section having a hole pattern B;
    a third side plate having a third side plate section, said third side plate section having said hole pattern A;
    a fourth side plate having a fourth side plate section, said fourth side plate section having said hole pattern B;
    a first end plate having a first end plate section, said first end plate section having a hole pattern C; and
    a second end plate having a second end plate section, said second plate section having said hole pattern C,
    wherein said hole pattern A comprises a plurality of hole pattern A holes with a slotted shape oriented in a first direction and said hole pattern B comprises a plurality of hole pattern B holes with a slotted shape oriented in a second direction, said second direction being perpendicular to said first direction.

2. The beam of claim 1 wherein:
    said first end plate and said second end plate each have one section;
    said first side plate, said second side plate, said third side plate and said fourth side plate each have at least one section and each have an identical number of sections.

3. The beam of claim 2 wherein said first side plate has a plurality of sections and each of said plurality of sections has said hole pattern A.

4. The beam of claim 1 wherein:
    said hole pattern A has:
       a plurality of hole pattern A side holes;
       a plurality of hole pattern A outer corner holes; and
       a plurality of hole pattern A inner corner holes;
    said hole pattern B has:
       a plurality of hole pattern B side holes;
       a plurality of hole pattern B outer corner holes; and
       a plurality of hole pattern B inner corner holes;
    said plurality of hole pattern A side holes and said plurality of hole pattern A outer corner holes each have a slotted shape and longitudinal axis oriented in said first direction;
    said plurality of hole pattern B side holes and said plurality of hole pattern B outer corner holes each have a slotted shape and longitudinal axis oriented in said second direction.

5. The beam of claim 4 wherein:
    said hole pattern A has an inner hole pattern with 12 holes and an outer hole pattern with 12 holes.

6. The beam of claim 1 wherein:
    said first side plate is opposite of said third side plate; and
    said second side plate is opposite of said fourth side plate.

7. The beam of claim 1 wherein said hole pattern C has an inner circular hole pattern with a plurality of elongated and curved slots.

8. The beam of claim 7 wherein said plurality of elongated and curved slots comprises eight slots.

9. The beam of claim 7 wherein said hole pattern C has an outer circular hole pattern with a plurality of curved slots.

10. The beam of claim 9 wherein said inner circular hole pattern and said outer circular hole pattern are concentric.

11. The beam of claim 10 wherein said hole pattern C has an outer hole pattern with twelve holes.

12. A beam comprising:
    a first side plate having a plurality of first side plate holes;

a second side plate having a plurality of second side plate holes;
a third side plate having a plurality of third side plate holes;
a fourth side plate having a plurality of fourth side plate holes;
a first end plate having a plurality of first end plate curved slots arranged in a circular pattern; and
a second end plate having a plurality of second end plate curved slots arranged in a circular pattern.

13. The beam of claim 12 wherein:
said plurality of first end plate curved slots has eight slots; and
said plurality of second end plate curved slots has eight slots.

14. The beam of claim 12 wherein:
said plurality of first end plate curved slots are a plurality of first end plate inner curved slots, and said first end plate further has a plurality of first end plate outer curved slots arranged in a circular pattern; and
said plurality of second end plate curved slots are a plurality of second end plate inner curved slots, and said second end plate further has a plurality of second end plate outer curved slots arranged in a circular pattern.

15. The beam of claim 12 wherein:
said first side plate has a first side plate section, said first side plate section having a hole pattern A;
said second side plate has a second side plate section, said second side plate section having a hole pattern B;
said third side plate has a third side plate section, said third side plate section having said hole pattern A;
said fourth side plate has a fourth side plate section, said fourth side plate section having said hole pattern B;
said hole pattern A has:
 a plurality of hole pattern A side holes;
 a plurality of hole pattern A outer corner holes; and
 a plurality of hole pattern A inner corner holes;
said hole pattern B has:
 a plurality of hole pattern B side holes;
 a plurality of hole pattern B outer corner holes; and
 a plurality of hole pattern B inner corner holes;
said plurality of hole pattern A side holes and said plurality of hole pattern A outer corner holes each have a slotted shape and longitudinal axis oriented in a first direction;
said plurality of hole pattern B side holes and said plurality of hole pattern B outer corner holes each have a slotted shape and longitudinal axis oriented in a second direction; and
said first direction is perpendicular to said second direction.

16. A beam comprising:
a first side plate having a first side plate section, said first side plate section having a hole pattern A;
a second side plate having a second side plate section, said second side plate section having a hole pattern B;
a third side plate having a third side plate section, said third side plate section having said hole pattern A;
a fourth side plate having a fourth side plate section, said fourth side plate section having said hole pattern B;
a first end plate having a first end plate section, said first end plate section having a hole pattern C; and
a second end plate having a second end plate section, said second plate section having said hole pattern C,
wherein:
said hole pattern A has:
 a plurality of hole pattern A side holes;
 a plurality of hole pattern A outer corner holes; and
 a plurality of hole pattern A inner corner holes;
said hole pattern B has:
 a plurality of hole pattern B side holes;
 a plurality of hole pattern B outer corner holes; and
 a plurality of hole pattern B inner corner holes;
said plurality of hole pattern A side holes and said plurality of hole pattern A outer corner holes each have a slotted shape and longitudinal axis oriented in a first direction;
said plurality of hole pattern B side holes and said plurality of hole pattern B outer corner holes each have a slotted shape and longitudinal axis oriented in a second direction; and
said first direction is different than said second direction; and
said hole pattern A has an inner hole pattern with 12 holes and an outer hole pattern with 12 holes.

17. A beam comprising:
a first side plate having a first side plate section, said first side plate section having a hole pattern A;
a second side plate having a second side plate section, said second side plate section having a hole pattern B;
a third side plate having a third side plate section, said third side plate section having said hole pattern A;
a fourth side plate having a fourth side plate section, said fourth side plate section having said hole pattern B;
a first end plate having a first end plate section, said first end plate section having a hole pattern C; and
a second end plate having a second end plate section, said second plate section having said hole pattern C,
wherein said hole pattern C has an inner circular hole pattern with a plurality of elongated and curved slots.

18. A beam comprising:
a first side plate having a plurality of first side plate holes;
a second side plate having a plurality of second side plate holes;
a third side plate having a plurality of third side plate holes;
a fourth side plate having a plurality of fourth side plate holes;
a first end plate having a plurality of first end plate curved slots arranged in a circular pattern; and
a second end plate having a plurality of second end plate curved slots arranged in a circular pattern,
wherein:
said plurality of first end plate curved slots has eight slots; and
said plurality of second end plate curved slots has eight slots.

19. A beam comprising:
a first side plate having a plurality of first side plate holes;
a second side plate having a plurality of second side plate holes;
a third side plate having a plurality of third side plate holes;
a fourth side plate having a plurality of fourth side plate holes;
a first end plate having a plurality of first end plate curved slots arranged in a circular pattern; and
a second end plate having a plurality of second end plate curved slots arranged in a circular pattern,
wherein:
said plurality of first end plate curved slots are a plurality of first end plate inner curved slots, and said first end plate further has a plurality of first end plate outer curved slots arranged in a circular pattern; and said plurality of second end plate curved slots are a plurality of second end plate inner curved slots, and said second end plate further has a plurality of second end plate outer curved slots arranged in a circular pattern.

20. A beam comprising:

a first side plate having a plurality of first side plate holes;

a second side plate having a plurality of second side plate holes;

a third side plate having a plurality of third side plate holes;

a fourth side plate having a plurality of fourth side plate holes;

a first end plate having a plurality of first end plate curved slots arranged in a circular pattern; and a second end plate having a plurality of second end plate curved slots arranged in a circular pattern, wherein:
- said first side plate has a first side plate section, said first side plate section having a hole pattern A;
- said second side plate has a second side plate section, said second side plate section having a hole pattern B;
- said third side plate has a third side plate section, said third side plate section having said hole pattern A;
- said fourth side plate has a fourth side plate section, said fourth side plate section having said hole pattern B;
- said hole pattern A has:
  - a plurality of hole pattern A side holes;
  - a plurality of hole pattern A outer corner holes; and
  - a plurality of hole pattern A inner corner holes;
- said hole pattern B has:
  - a plurality of hole pattern B side holes;
  - a plurality of hole pattern B outer corner holes; and
  - a plurality of hole pattern B inner corner holes;
- said plurality of hole pattern A side holes and said plurality of hole pattern A outer corner holes each have a slotted shape and longitudinal axis oriented in a first direction;
- said plurality of hole pattern B side holes and said plurality of hole pattern B outer corner holes each have a slotted shape and longitudinal axis oriented in a second direction; and
- said first direction is perpendicular to said second direction.

* * * * *